US007130757B2

(12) United States Patent
Corwin et al.

(10) Patent No.: US 7,130,757 B2
(45) Date of Patent: Oct. 31, 2006

(54) REMOTE MONITORING SYSTEM

(75) Inventors: Wallace Dale Corwin, Bend, OR (US); Michael Shayne Walker, Redmond, OR (US); Budd William Beatty, Gambier, OH (US)

(73) Assignee: JELD-WEN, inc., Klamath Falls, OR (US)

( * ) Notice: Subject to any disclaimer, the term of this patent is extended or adjusted under 35 U.S.C. 154(b) by 152 days.

(21) Appl. No.: 11/003,911

(22) Filed: Dec. 3, 2004

(65) Prior Publication Data

US 2005/0131652 A1 Jun. 16, 2005

Related U.S. Application Data

(60) Provisional application No. 60/526,462, filed on Dec. 3, 2003.

(51) Int. Cl.
*G01D 1/00* (2006.01)

(52) U.S. Cl. ...................................................... 702/127

(58) Field of Classification Search ................. 702/127
See application file for complete search history.

(56) References Cited

U.S. PATENT DOCUMENTS 4,030,089 A * 6/1977 Wurfel ....................... 340/550
4,197,866 A 4/1980 Neal
4,227,190 A 10/1980 Kelley et al.
4,259,633 A 3/1981 Rosenau
4,264,902 A 4/1981 Miller
4,350,978 A 9/1982 Riccobono
4,598,273 A 7/1986 Bryan, Jr. et al.
4,652,745 A 3/1987 Zanardelli
4,797,663 A 1/1989 Rios
4,816,748 A 3/1989 Tazawa et al.
4,816,822 A 3/1989 Vache et al.
4,823,290 A 4/1989 Fasack et al.
4,892,113 A 1/1990 Fattahi
4,942,364 A 7/1990 Nishijima et al.
4,965,554 A 10/1990 Darling
4,968,975 A 11/1990 Fritz
5,008,652 A 4/1991 Woloszyk
5,081,422 A 1/1992 Shih
5,082,173 A 1/1992 Poehlman et al.

(Continued)

FOREIGN PATENT DOCUMENTS

DE 3636074 A1 4/1988

(Continued)

OTHER PUBLICATIONS

PCT Search Report, corresponding to PCT/US2004/040720, mailed on Apr. 25, 2005.

(Continued)

*Primary Examiner*—Bryan Bui
*Assistant Examiner*—Stephen J. Cherry
(74) *Attorney, Agent, or Firm*—Nelson Mullins Riley & Scarborough LLP

(57) ABSTRACT

A remote monitoring system is disclosed. In one such embodiment, a system may comprise a first measuring unit disposed within a structure, a first processor disposed in operative communication with the first measuring unit, and a second processor disposed within the structure. The first measuring unit may comprise a first sensor adapted to detect a first parameter. The first measuring unit may be adapted to output a first signal associated with the first parameter. The first processor may be adapted to receive the first signal and to control the first measuring unit. The second processor may be disposed in operative communication with the first measuring unit and the first processor.

5 Claims, 14 Drawing Sheets

U.S. PATENT DOCUMENTS

| | | | | |
|---|---|---|---|---|
| 5,106,339 | A | 4/1992 | Braun et al. | |
| 5,136,285 | A | 8/1992 | Okuyama | |
| 5,165,465 | A * | 11/1992 | Kenet | 165/11.1 |
| 5,176,316 | A | 1/1993 | Whitman | |
| 5,226,256 | A | 7/1993 | Fries et al. | |
| 5,283,549 | A | 2/1994 | Mehaffey et al. | |
| 5,311,451 | A | 5/1994 | Barrett | |
| 5,337,957 | A | 8/1994 | Olson | |
| 5,400,246 | A | 3/1995 | Wilson et al. | |
| 5,491,473 | A | 2/1996 | Gilbert | |
| 5,491,789 | A | 2/1996 | Aramaki et al. | |
| 5,546,009 | A | 8/1996 | Raphael | |
| 5,553,006 | A | 9/1996 | Benda | |
| 5,617,337 | A | 4/1997 | Eidler et al. | |
| 5,687,098 | A | 11/1997 | Grumstrup et al. | |
| 5,730,024 | A | 3/1998 | Sahlen | |
| 5,748,092 | A | 5/1998 | Arsenault et al. | |
| 5,798,945 | A | 8/1998 | Benda | |
| 5,818,340 | A | 10/1998 | Yankielun et al. | |
| 5,844,138 | A | 12/1998 | Cota | |
| 5,881,951 | A | 3/1999 | Carpenter | |
| 5,886,636 | A | 3/1999 | Toomey | |
| 5,892,690 | A | 4/1999 | Boatman et al. | |
| 5,914,656 | A | 6/1999 | Ojala et al. | |
| 6,104,298 | A | 8/2000 | Flanders | |
| 6,144,017 | A | 11/2000 | Millett et al. | |
| 6,157,306 | A | 12/2000 | Mularoni | |
| 6,175,310 | B1 | 1/2001 | Gott | |
| 6,377,181 | B1 | 4/2002 | Kroll et al. | |
| 6,397,662 | B1 | 6/2002 | Alkhoury | |
| 6,420,973 | B1 | 7/2002 | Acevedo | |
| 6,422,062 | B1 | 7/2002 | King et al. | |
| 6,452,499 | B1 | 9/2002 | Runge et al. | |
| 6,514,721 | B1 | 2/2003 | Spurrell | |
| 6,570,508 | B1 | 5/2003 | Kvenvold | |
| 6,575,234 | B1 | 6/2003 | Nelson | |
| 6,658,091 | B1 | 12/2003 | Naidoo et al. | |
| RE38,985 | E | 2/2006 | Boatman et al. | |
| 7,027,416 | B1 * | 4/2006 | Kriz | 370/328 |
| 2003/0030813 | A1 | 2/2003 | Martin | |

FOREIGN PATENT DOCUMENTS

| | | | |
|---|---|---|---|
| GB | 2 235 535 | A | 6/1991 |
| JP | 361128047 | A | 6/1986 |
| JP | 02264854 | A | 10/1990 |
| JP | 10131320 | A | 5/1998 |
| WO | WO 99/17477 | A | 4/1999 |
| WO | WO 02/08717 | A1 | 1/2002 |

OTHER PUBLICATIONS

A. Tenwolde, G.E. Courville, PH.D., Instrumentation For Measuring Moisture in Building Envelopes, American Society of Heating, Refrigerating and Air-Conditioning Engineers, Inc. 1985, pp. 1101-1115, vol. 91, Part 2B, Atlanta, GA, USA; Symposium Papers—Honolulu, Hawaii.

Whiting, D., Assessment of Potential Techniques for In-Situ, Real Time Moisture Measurements in Building Envelope Systems-a Literature Survey, ORNL/SUB-83-40122/1, 1983, USA.

* cited by examiner

150

| 151 DATE | 152 TIME | 153 ID | 154 TYPE | 155 ELEVATION | 156 SAMPLE INTERVAL (SEC) | LOG INTERVAL | 157 BATTERY | 158 TEMPERATURE | 159 HUMIDITY |
|---|---|---|---|---|---|---|---|---|---|
| 12/03/2003 | 2:56:00 PM | 5 | Sen | N | 15.0 | 15 | 3.6 | 71.0 | 31.7 |
| 12/03/2003 | 2:56:00 PM | 7 | Sen | N | 15.0 | 15 | 3.5 | 71.0 | 31.2 |
| 12/03/2003 | 2:56:00 PM | 8 | Sen | N | 15.0 | 15 | 3.6 | 71.1 | 31.2 |
| 12/03/2003 | 2:56:00 PM | 12 | Sen | N | 15.0 | 15 | 3.6 | 70.9 | 31.2 |
| 12/03/2003 | 2:56:00 PM | 19 | Sen | N | 15.0 | 15 | 3.6 | 70.9 | 31.7 |
| 12/03/2003 | 2:56:00 PM | 21 | Sen | N | 60.0 | 15 | 3.6 | 71.2 | 30.6 |
| 12/03/2003 | 2:56:00 PM | 23 | Sen | N | 15.0 | 15 | 3.6 | 71.2 | 31.2 |
| 12/03/2003 | 2:56:00 PM | 54 | Sen | N | 15.0 | 15 | 3.5 | 71.3 | 31.2 |
| 12/03/2003 | 2:56:00 PM | 55 | Sen | N | 15.0 | 15 | 3.6 | 71.2 | 31.2 |
| 12/03/2003 | 2:56:15 PM | 5 | Sen | N | 15.0 | 15 | 3.6 | 71.0 | 31.2 |
| 12/03/2003 | 2:56:15 PM | 7 | Sen | N | 15.0 | 15 | 3.5 | 71.1 | 31.2 |
| 12/03/2003 | 2:56:15 PM | 8 | Sen | N | 15.0 | 15 | 3.6 | 71.1 | 31.2 |
| 12/03/2003 | 2:56:15 PM | 12 | Sen | N | 15.0 | 15 | 3.6 | 70.9 | 31.2 |
| 12/03/2003 | 2:56:15 PM | 19 | Sen | N | 15.0 | 15 | 3.6 | 70.9 | 31.2 |
| 12/03/2003 | 2:56:15 PM | 21 | Sen | N | 60.0 | 15 | 3.6 | 71.2 | 31.2 |
| 12/03/2003 | 2:56:15 PM | 23 | Sen | N | 15.0 | 15 | 3.6 | 71.2 | 31.2 |
| 12/03/2003 | 2:56:15 PM | 54 | Sen | N | 15.0 | 15 | 3.6 | 71.3 | 30.6 |
| 12/03/2003 | 2:56:15 PM | 55 | Sen | N | 15.0 | 15 | 3.6 | 71.3 | 31.2 |

FIG.3

REMOTE MONITORING SYSTEM

RELATED APPLICATION AND CLAIM FOR PRIORITY

This application claims priority to U.S. Provisional Patent Application No. 60/526,462, entitled "Remote Monitoring System," filed on Dec. 3, 2003, the priority benefit of which is claimed by this application, and which is incorporated in its entirety herein by reference.

NOTICE OF COPYRIGHT PROTECTION

A portion of the disclosure of the patent document and its figures contain material subject to copyright protection. The copyright owner has no objection to the facsimile reproduction by anyone of the patent document, but otherwise reserves all copyrights whatsoever.

FIELD OF THE INVENTION

The present invention relates generally to monitoring systems, and more particularly, to monitoring systems operable to transmit data related to a building or structure to a remote location.

BACKGROUND

Excessive humidity and temperature extremes may place stress on the integrity of building structures. Such temperature and moisture extremes can cause building materials to shrink and swell thereby deforming the structure. The strain on building materials is particularly detrimental on those structures, such as windows and doors, that provide an interface between the inside and outside of a building. Also, windows and doors typically include a variety of different materials and/or parts which need to be able to move in relation to each other while maintaining the overall integrity of the unit. Under conditions of extreme humidity and temperature, both windows and doors may develop leaks where air or moisture can enter a building. Excessive humidity and temperature extremes may result in loss of integrity to the point that the window or door needs to be repaired or replaced.

A variety of monitoring systems have been developed to detect specific parameters of interest. For example, monitoring systems are described to monitor environmental conditions such as rainfall, smoke, or carbon monoxide (e.g., U.S. Pat. Nos. 5,892,690, 5,914,656, 6,570,508, and 6,452,499). Still, these systems are designed as one-way conveyors of information and thus, do not allow for a user remote from the point of data collection to modify the system, or to remotely interact with the system in a proactive manner.

Monitoring systems may be used in buildings to monitor moisture and temperature (e.g., U.S. Pat. Nos. 5,844,138 and 6,377,181). Known monitoring systems may include a relative humidity sensor, a temperature sensor, and a microprocessor and memory (e.g., HOBO® data logging unit manufactured and sold by Onset Computer Corporation, Bourne, Mass.). In general, such systems must be locally accessed for data retrieval. Also, such systems do not allow for remote control of the system (i.e., such as allowing the user to change the measurement parameters). Thus, such systems require that a specially trained individual visit each monitoring station to obtain the data required for analysis. Thus, while such systems may provide the historical data necessary to perform a forensic analysis, such systems may be ineffective in detecting and providing notification of the risk of a future water intrusion event.

Thus, what is needed is a system for the non-destructive monitoring of a building that allows changes in humidity and/or temperature associated with a loss of structural integrity to be assessed. Also, what is needed is a system that is able to compile and simultaneously analyze data from a plurality of sensors such that the conditions in one building may be compared to conditions at similarly situated buildings. In this way, changes prognostic of a loss of building integrity may be detected and repaired in a cost-effective manner.

SUMMARY

The present invention may provide remote monitoring systems and methods. An exemplary system may monitor changes in certain physical parameters at a particular site, e.g., in a building. For example, the present invention may provide systems and methods that may monitor and analyze the integrity of a window, a door, or a plurality of windows and/or doors, in one or more buildings. Additionally, the present invention may control the sampling of data from a plurality of remote sites, and analyze the data such that changes over time may be monitored.

Monitoring may be used to determine whether the windows and/or doors in a particular building are structurally intact. Such monitoring may be performed by measuring temperature and humidity inside of a wall cavity and then making comparisons between the exterior and interior readings of predetermined physical parameters, such as humidity and temperature. Water and/or air intrusion events may be detected and resolved before damaging the structure.

In one embodiment, the present invention may provide a remote monitoring system to measure and detect changes in temperature, absolute humidity, and relative humidity in the proximity of a window unit. In another embodiment, the system may able to warn an individual that a high risk situation exists, such that preventative measures may be taken to avoid further deterioration of the building and/or window unit.

An embodiment of the present invention may comprise a first measuring unit disposed within a structure, a first processor disposed in operative communication with the first measuring unit, and a second processor disposed within the structure. The terms "communicate" or "communication" mean to mechanically, electrically, optically, or otherwise contact, couple, or connect by either direct, indirect, or operational means.

The first measuring unit may comprise a first sensor adapted to detect a first parameter. The first measuring unit may be adapted to output a first signal associated with the first parameter. The first processor may be adapted to receive the first signal and to control the first measuring unit. The second processor may be disposed in operative communication with the first measuring unit and the first processor.

Another embodiment of the present invention may comprise a plurality of first measuring units disposed within a building a wireless network disposed in communication with the plurality of first measuring units, and a remote processor disposed in communication with the wireless network. Each one of the plurality of first measuring units may comprise a first sensor adapted to detect a first parameter. Each one of the first measuring units may be adapted to output a first signal associated with the first parameter. The remote processor may be adapted to receive the first signal from the wireless network and to control the plurality of first measuring units.

Still another embodiment of the present invention may comprise detecting by a first sensor a first parameter, generating by a first measuring unit a first signal associated with the first parameter, and communicating the first signal to a remote processor operable to control the first measuring unit. The first sensor may be disposed in operative communication with the first measuring unit. The remote processor may be disposed in operative communication with the first measuring unit.

Yet another embodiment of the present invention may comprise associating a first value of a first parameter measured by a first sensor at a first time with a first geometric shape comprising a first size, associating a second value of the first parameter measured by the first sensor at a second time with a second geometric shape comprising a second size, and displaying the first and second geometric shapes superposed on a graphic representation of a structure. A position of the displayed first and second geometric shapes may correspond to a position of the first sensor disposed in the structure.

In an embodiment, the present invention may provide a system adapted to monitor and analyze the integrity of a window, or a plurality of windows, in one or more buildings. In yet a further embodiment, the present invention may control the sampling of data from a plurality of remote sites, and analyze the data such that changes over time may be monitored. Such an exemplary system may be able to detect when the integrity of the structure has fallen below a certain predetermined limit, such that preventative maintenance may be performed.

For example, in an embodiment, the present invention may comprise a remote monitoring system comprising: a plurality of measuring units comprising at least one type of sensor able to measure a physical parameter of interest that are placed at a plurality of sites; a wireless network in communication with the plurality of measuring units; a central processing unit in remote communication with the wireless network; and a computer program that allows a user to control communication of the plurality of measuring units with the wireless network and the processing unit.

In an embodiment, a computer processor may compile and analyze data collected by the network. Also in an embodiment, the measuring units comprise sensors able to measure temperature. Alternatively, and/or additionally, the measuring units may comprise sensors able to measure humidity and/or relative humidity, among other physical parameters. As is known in the art, relative humidity is the ratio of the amount of water vapor actually present in the air to the greatest amount possible at the same temperature.

The sensors may be used to measure any physical parameter of interest. Where the sensors measure temperature and/or relative humidity, at least some of the sensors may be placed in proximity to a plurality of window structures to detect a potential loss of integrity in the window structure.

In another embodiment, the present invention may comprise a remote monitoring system comprising: a plurality of measuring units comprising at least one type of sensor able to measure temperature and humidity that are placed in proximity to a plurality of sites; a wireless network in communication with the plurality of measuring units; a central processing unit in communication with the wireless network; and a computer program which allows a user to control communication of the plurality of measuring units with the wireless network and the central processing unit, and wherein the computer program compiles and analyzes data collected by the network. In an embodiment, the sensor may be adapted to measure relative humidity. Also in an embodiment, the system may comprise an interface board that connects the plurality of measuring units to the network.

In yet another embodiment, the present invention may comprises a computer-implemented method for monitoring a plurality of measuring units comprising at least one type of sensor, wherein the sensors are placed in proximity to a plurality of predetermined sites, and further comprising a wireless network in communication with the plurality of measuring units; a central processing unit in communication with the wireless network, and a computer program, which may allow a user, through a graphical user interface, to control communication of the plurality of measuring units with the wireless network and the central processing unit, and wherein the computer program compiles and analyzes data collected by the network. Also in an embodiment, the measuring units may comprise sensors able to measure temperature. Alternatively, and/or additionally, the measuring units may comprise sensors able to measure humidity and/or relative humidity.

The present invention also comprises computer-readable medium on which is encoded programming code for monitoring a plurality of measuring units comprising at least one type of sensor which are placed in proximity to a plurality of predetermined sites and further comprising a wireless network in communication with the plurality of measuring units; a central processing unit in communication with the wireless network; and a computer program which allows a user to control communication of the plurality of measuring units with the wireless network and the central processing unit, and wherein the computer program compiles and analyzes data collected by the network. Also in an embodiment, the measuring units comprise sensors able to measure temperature. Alternatively, and/or additionally, the measuring units may comprise sensors able to measure humidity and/or relative humidity.

Embodiments of the present invention offer a wide variety of advantages and features. For example, one advantage and feature of the present invention is to provide a system that avoids costly and destructive testing methods often used in the field to assess loss of integrity in building structures. Because the system is remote, the need for an individual to go to the site where the sensors are placed is minimized.

Also, the present invention may provide a wireless mesh network of sensors, such as for example temperature and relative humidity sensors, that allow for tracking and analyzing window units exposed to various environmental conditions. In this way data use and acquisition may be maximized.

Yet another advantage and feature of the present invention may be to provide a database for compiling and analysis of data from various locations. By comparing data collected from a large number of units at a wide variety of locations, various parameters important to the loss of structural integrity of windows and other building units or systems may be assessed, modeled, and predicted.

Also, another advantage and feature of the present invention may be to provide a means to evaluate the relative risk that a building, or structural unit within a building, may develop a leak or other type of loss in efficiency. Thus, the present invention may provide a signal notifying an individual monitoring the system that a there is an increased risk that a building unit (or structural part thereof) is in danger of developing a leak or other type of structural deformity. In this way, proactive measures may be taken to address the situation before damage may occur. Also, such information is useful in forensic analysis of failed systems (including catastrophic analysis) and the design of windows and/or doors.

The present invention may be better understood by reference to the description and figures that follow. It is to be understood that the invention is not limited in its application to the specific details as set forth in the following description and figures. The invention is capable of other embodiments and of being practiced or carried out in various ways.

BRIEF DESCRIPTION OF THE FIGURES

These and other features, aspects, and advantages of the present invention are better understood when the following Detailed Description is read with reference to the accompanying drawings, wherein:

FIG. 3 shows a table of data compiled from a system according to an embodiment of the present invention.

DETAILED DESCRIPTION

Figure 1:
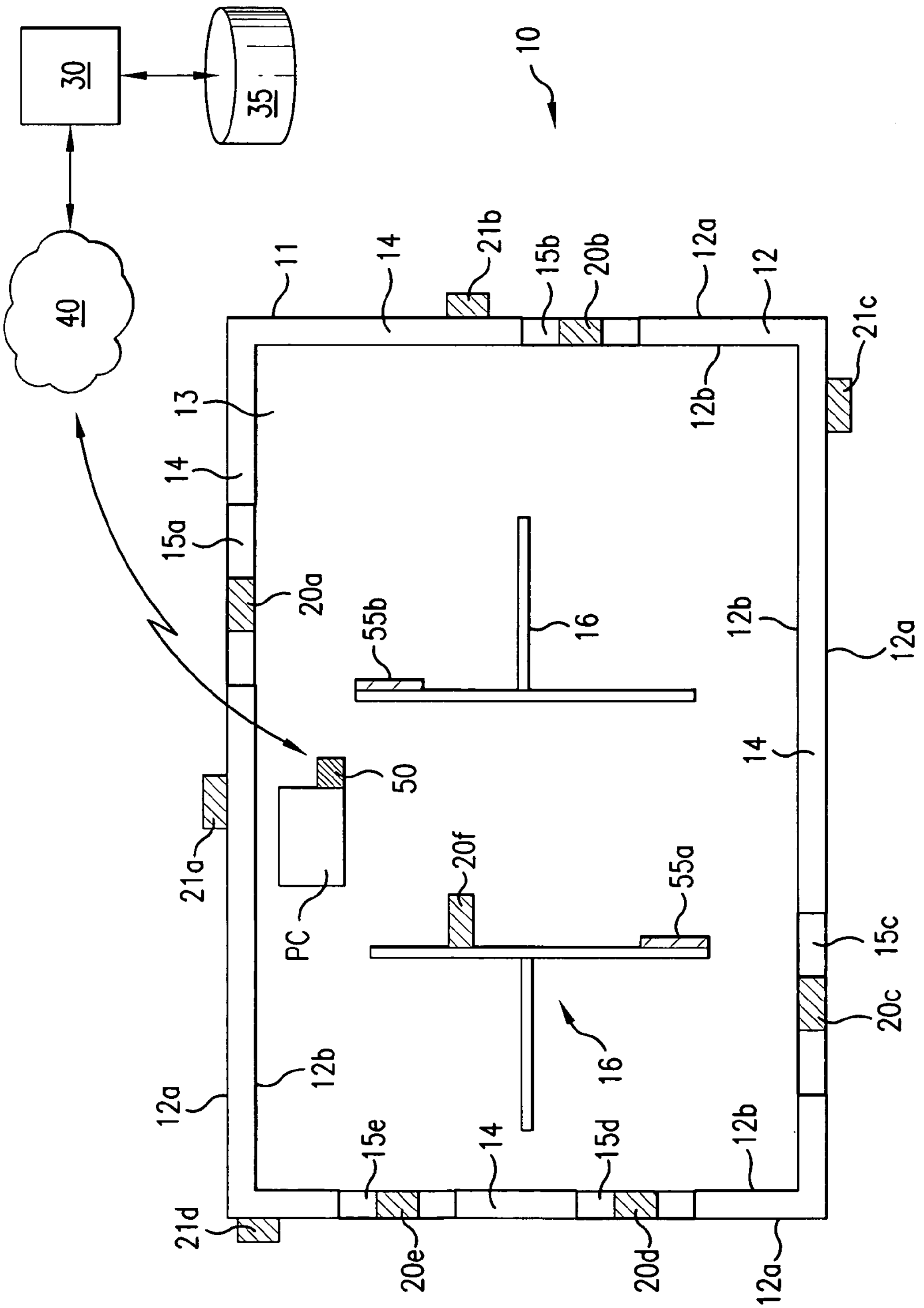
FIG. 1 shows a schematic drawing of a system in accordance with an embodiment of the present invention.

Embodiments of the present invention provide remote monitoring systems and methods. A variety of systems and methods may be implemented according to the present invention, and they may operate in a variety of environments. By way of introduction and example, the subject matter of the present invention in one embodiment may relate to monitoring changes in predetermined physical parameters at a particular structure, site, or location, such as for example, in a building.

In an exemplary embodiment, sensors may be positioned near an area of interest, such as near a window. For example, the system may be used by a building owner to gather data such that potential risk situations, such as water intrusion or mold growth, may be resolved before adverse effects manifest themselves. The system also may be used by a window manufacturer to gather data important to assess the particular designs and/or technologies. For example, by comparing the amount of water and/or air leakage for different window units placed in different sites, designs may be optimized for particular environment/weather profiles.

As discussed above, the sensors may be placed in close proximity to, or at, a particular site of interest. It is not necessary, however, that the sensors be in plain view. For example, the sensors may be placed in a cavity underneath a window (or door). In many cases the cavity under the window is found to be directly impinged by intrusion of water and/or external air. Thus, in one embodiment, a sensor operable to detect temperature and/or humidity may be placed in a wall cavity, such as between studs that support the wall.

In such an embodiment, a hole may be drilled in the wall, and the sensor may be placed within the wall with a cover plate or some other type of covering used to cover the sensor. A hollow tube (such as PVC piping) may be coupled with the cover plate to provide shielding or protection for the sensor's delicate electrical components from various extreme environmental conditions, such as direct contact with water. Additionally, the sensor may be encapsulated with a rubberized material to provide such shielding or protection for the sensor.

It is not required that the sensor be placed in the cavity below the window. The sensor may also placed in proximity to a window, but not within the wall space. For example, the sensor may be placed along the upper, lower, or side edge of the window sill, in such a manner as to be unobtrusive, but in close proximity to the window.

In addition to monitoring the environment directly below the window, the measurement of other environments can provide data that may be important to the interpretation of the integrity of windows or other building structures. Thus, in addition to monitoring the cavity beneath the window, sensors may be placed throughout the interior of the building. Also, sensors may be placed on the exterior of the building. For example, the sensors may be placed at different elevations (North, South, East, and West) on the outside of the building.

In one such way, a direct comparison of the conditions outside the building, near the window, and inside the building, both close to, and remote from, the window can be compared. This type of comparison can indicate where there is a localized increase in humidity or change in temperature specific to a particular window unit. For example, such measurements would be expected to take into account an expected increase in humidity (e.g., the use of a shower) from an unexpected increase in humidity (e.g., a window leak). The above description is but one exemplary embodiment of the present invention.

Referring now to FIG. 1, a schematic drawing of a system 10 according to an embodiment of the present invention is shown. The system 10 is shown installed in a structure, such as a building 11. The building 11 may comprise several levels or stories. An exemplary level of the building 11 is shown in a plan view.

The building 11 may comprise an exterior wall 12 comprising a first wall 12*a* and a second wall 12*b*. The first wall 12*a* may form an exterior surface of the building 11, which may be exposed to the elements, such as rain, wind, sun, snow, and ice. The second wall 12*b* may be disposed generally parallel to the first wall 12*a*. The second wall 12*b* may form and define an interior 13 of the building 11. A cavity 14 may be formed and defined by the first wall 12*a* and the second wall 12*b*. Portions of the cavity 14 may be hollow. A framework (not shown) of wood or metal studs, conduit, and/or piping may be disposed in the cavity 14. One or more windows 15*a*–*e* and/or doors (not shown) may be disposed in the cavity 14. One or more interior walls 16 may be disposed in the interior 13 of the building.

The system 10 may comprise a first measuring unit 20*a* disposed within the building 11. In one embodiment, the first measuring unit 20*a* may comprise a plurality of first measuring units, e.g., 20*a–f*. Each one of the plurality of first measuring units 20*a–f* may be disposed inside a boundary formed by the first wall 12*a*. One or more of the plurality of first measuring units 20*a–f* may be disposed in the cavity 14.

In an embodiment, at least some of the plurality of first measuring units 20*a–f* may be placed in proximity to a plurality of windows 15*a–e* to detect a potential loss of structural integrity. For example, the first measuring units 20*a–f* may be placed inside the wall cavity 14 that is underneath the windows 15*a–e* of interest. Alternatively, and/or additionally, at least some of the plurality of first measuring units 20*a–f* may be placed in proximity to a plurality of door structures (not shown) to detect a potential loss of integrity of the door.

In some cases where a defective or structurally compromised window allows moisture or air to pass through, water and/or air may leak through such a window into the cavity 14 beneath the window. Thus, in an embodiment, at least a portion of the plurality of first measuring units 20*a–f* may be placed in the cavity 14 beneath the windows 15*a–e*.

One or more of the plurality of first measuring units 20*a–f* may be disposed proximate to the windows 15*a–e*. For example, the first measuring units 20*a–f* may be disposed in communication with the windows 15*a–e*. In another embodiment, the first measuring units 20*a–f* may be coupled with the windows 15*a–e*. One or more of the plurality of first measuring units 20*a–f* may be disposed in the interior 13 of the building 11. For example, first measuring unit 20*f* is disposed proximate to one of the plurality of interior walls 16 in the interior 13 of the building 11.

One or more of the plurality of first measuring units 20*a–f* may be placed in areas of the building 11 that are not readily accessible by individuals. As described above, the plurality of first measuring units 20*a–f* may be placed in the cavity 14 between the first wall 12*a* and the second wall 12*b*, or in very high or low positions to be out of site to most observers.

It may be desirable to compare the temperature and humidity (or other parameters of interest) in proximity to the structure of interest (e.g., one or more of the windows 15*a–e*) to the temperature and humidity in other regions of the building 11 (e.g., in the interior 13 of the building 11, away from the plurality of windows 15*a–e*), or to the outside environment.

In one embodiment, the system 10 may comprise a second measuring unit 21*a* disposed proximate to an exterior of the building 11. In one embodiment, a plurality of second measuring units 21*a–d* may be coupled to the first wall 12*a* of the exterior wall 12. The plurality of second measuring units 21*a–d* may be disposed outside of the building 11 to provide comparative readings with the plurality of first measuring units 20*a–f*.

In one embodiment, each one of the plurality of second measuring units 21*a–d* may be disposed on different levels (not shown) of the first wall 12*a*. One or more of the plurality of second measuring units 21*a–d* may be coupled to a roof (not shown) of the building 11. One or more of the plurality of second measuring units 21*a–d* may be disposed a predetermined distance from the building 11. The plurality of second measuring units 21*a–d* may be disposed in other suitable arrangements or positions.

Each one of the plurality of first measuring units 20*a–f* may comprise a first sensor (not shown) adapted to detect a first parameter. The first measuring units 20*a–f* may be adapted to output a first signal associated with the first parameter. In one embodiment, the second measuring units 21*a–d* may comprise a second sensor (not shown) adapted to detect a second parameter. The second parameter may be the same as the first parameter. The second measuring units 21*a–d* may be adapted to output a second signal associated with the second parameter.

In another embodiment, one or more of the first measuring units 20*a–f* may comprise a third sensor adapted to detect a third parameter. The third parameter may be different than the first parameter. The first measuring units 20*a–f* may be adapted to output a third signal associated with the third parameter.

A sensor may be a device used to provide a signal for the detection or measurement of a physical and/or chemical property to which the sensor responds. Sensors to measure a variety of physical conditions and/or chemical components are commercially available. For example, sensors to measure temperature and humidity are available from several manufacturers, such as Digikey, MCM Electronics, and Onset. Sensors to monitor gas, smoke, particulate matter, specific chemicals (CO, $CO_2$, radon and the like) are also available from a variety of commercial sources.

Other parameters may be measured and used with the systems and methods of the present invention, such as for example, light, relative humidity (as is known in the art, relative humidity is a ratio of an amount of water vapor actually present in the air to a greatest amount possible at the same temperature), moisture (including water in a liquid state), stress, strain, electrical resistance, electrical capacitance, orientation (direction), position (such as that detected by a global positioning system (GPS)), deformation, vibration, acceleration, pressure, shock, motion, open/close sensors, on/off sensors, and biosensors, may be used with the systems and methods of the present invention.

In an embodiment, the first sensor of the first measuring unit 20*a* may comprises a temperature sensor and the third sensor may comprise a humidity/relative humidity sensor. The second sensor of one or more of the second measuring units 21*a–d* may comprise a temperature sensor.

The first and third sensors may be disposed on one semiconductor chip. The chip may be a silicon chip, although other sensors known in the art may be used. For example, a complimentary metal oxide semi-conductor (CMOS) sensor commercially available from Sensirion (Zurich, Switzerland) may be used. CMOS sensors allow both temperature and humidity to be detected on the same material, which improves the relevance of the data. Such sensors may be interfaced via a two wire serial port (not shown). Alternatively, and/or additionally, an analog sensor (which measures voltage changes), digital (on/off sensing device), and other types of sensors may be used.

Another exemplary sensor may comprise a plurality of conductive inks printed onto a polyester or other similar material. The conductive inks may be printed in straight, curved, or other suitable shapes and/or designs. One side of such as sensor may be an adhesive for mounting or attaching to a surface of interest, such as the first wall 12*b*, inside the cavity 14, outside the cavity 14, or any component of the exterior wall 12. When liquid contacts this exemplary sensor, a resistance/voltage across the conductive inks may change. Such a sensor is commercially available from Conductive Technologies; York, Pa.

In an embodiment, the first sensor may be powered by direct connection to an electrical circuit disposed within the building 11. Alternatively, the first sensor may be powered by an alternate or dedicated power supply, such as a battery. For example, the first sensor may be powered by a standard AA battery. Alternatively, the battery may comprise a predetermined voltage range, such as a voltage range from 2.7 to 3.6 volts. In one embodiment, the voltage may range from 3 to 3.25 volts.

In an alternate embodiment, a long-life battery may be used. For example a lithium chloride battery (manufactured by Tadiran; Port Washington, N.Y.) may be used. The lithium chloride battery may be the size of a typical AA battery. Or in an embodiment, the battery may be the size of a C-type battery. By using the power source intermittently, and allowing the system to remain dormant, the lifetime of the battery may be extended. The use of a long-lived battery may allow for the first sensor to be placed in remote locations which may not have easy access to a power supply.

In one embodiment, the system 10 may comprise a first processor, such as remote processor 30, disposed in operative communication with each of the first measuring units 20*a–f*. In another embodiment, the remote processor 30 may be disposed in operative communication with the plurality of second measuring units 21*a–d*. The remote processor 30 may be adapted to receive the first, second, and third signals and to control each of the first measuring units 20*a–f* and the second measuring units 21*a–d*.

In an embodiment, the remote processor 30 may be in communication with the plurality of first measuring units 20*a–f* and the plurality of second measuring units 21*a–d* via a network 40. The network 40 shown may comprise the Internet. In other embodiments, other networks, such as an intranet, wide-area network (WAN), or local-area network (LAN) may be used.

The remote processor 30 may comprise a computer-readable medium, such as a random access memory (RAM) (not shown) coupled to a processor (not shown). The processor may execute computer-executable program instructions stored in memory (not shown). Such processors may comprise a microprocessor, an ASIC, and state machines. Such processors comprise, or may be in communication with, media, for example computer-readable media, which stores instructions that, when executed by the processor, cause the processor to perform the processes described herein.

Embodiments of computer-readable media include, but are not limited to, an electronic, optical, magnetic, or other storage or transmission device capable of providing a processor, such as the remote processor 30, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions.

Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

The remote processor 30 may be a personal computer, digital assistant, personal digital assistant, cellular phone, mobile phone, smart phone, pager, digital tablet, laptop computer, Internet appliance, and other processor-based devices. In general, the remote processor 30 may be any type of suitable processor-based platform that is connected to the network 40 and that interacts with one or more application programs. The remote processor 30 may be disposed remotely from the building 111 or the point or area of collection of data.

The remote processor 30 may operate on any operating system capable of supporting a browser or browser-enabled application, such as Microsoft® Windows® or Linux. The remote processor 30 includes, for example, personal computers executing a browser application program such as Microsoft Corporation's Internet Explorer™, Netscape Communication Corporation's Netscape Navigator™, and Apple Computer, Inc.'s Safari™.

In one embodiment, the system 10 may comprise a second processor, such as local processor 50, disposed in operative communication with the plurality of first measuring units 20*a–f*, the plurality of second measuring units 21*a–d*, and the remote processor 30. The local processor 50 may be a processor similar to that described above with respect to the remote processor 30. Alternatively, other suitable processors may be used for the local processor 50.

The local processor 50 may be disposed within the building 11. For example, the local processor 50 may be disposed in the interior 13 of the building 11. Alternatively, the local processor 30 may be disposed outside the building 11, such as for example coupled with the exterior wall 12 of the building or disposed on the roof of the building 11. The local processor 50 may be in communication with the remote processor 30 via the network 40. Alternatively, the local processor 50 may be coupled with the remote processor 30 using other suitable means.

In one embodiment, the local processor 50 may comprise a gateway, which may allow the data to be sent, e.g., transmitted, to the remote processor 30. In one embodiment, there may be a plurality of local processors 50, each comprising its own processor controlling data acquisition, data processing, and communicating the data to the remote processor 30. Alternatively and/or additionally, the local processor 50 may be directly connected to a desktop computer (not shown) via a serial port. In this way, data from the local processor may be downloaded to the desktop computer.

In another embodiment, the system 10 comprises a router 55*a*. There may be a plurality of routers 55*a*, 55*b*. The routers 55*a*, 55*b* may be disposed in the interior 13 of the building 11. For example, the routers 55*a*, 55*b* may be coupled with at least one of the plurality of interior walls 16. The routers 55*a*, 55*b* may be positioned discretely, such as on floorboard molding, in a closet, cabinet, or behind furniture. The routers 55*a*, 55*b* may be placed where a power source is available. The routers 55*a*, 55*b* may be disposed in other suitable locations, generally out of view of observers, including external to the building 11.

The routers 55*a*, 55*b*, and the local processor 50 may comprise a network. In one embodiment, the plurality of first measuring units 20*a–f* and the plurality of second measuring units 21*a–d* may also comprise the network. The network may be adapted to facilitate communication between the measuring units 20, 21 (e.g., sensors) and the remote processor 30. The network may take a variety of forms. In an embodiment, the network may comprise wireless communication between at least some of the components of the system 10.

Signals transmitted from any measuring unit 20, 21 within range of a particular router 55*a*, 55*b* may be collected and then transmitted by the router 55*a*, 55*b* to the local processor 50. The local processor 30 may be coupled with a computer or modem line for transmission of the signals to the remote processor 30, which may be located at a location separate from the building 11. Alternatively, the remote processor 30 may be located in the same building 11, but separate and apart from the local processor 50, such as on a different floor or level of the building 11.

Also in an embodiment, the network may comprise a self-organizing network, in that the network facilitates each sensor may communicate with the remote processor 30 in any way possible. The sensor may be configured to choose the most efficient way to communicate with the remote processor 30.

The network may be disposed within the building 11. Alternatively, portions of the network may be disposed external to the building 11, such as the plurality of second measuring units 21*a–d*. The routers 55*a*, 55*b* may facilitate wireless communication between the plurality of first measuring units 20*a–f* and the local processor 50 and the plurality of second measuring units 21*a–d* and the local processor 50.

The network may be organized to collect data from the plurality of first measuring units 20*a–f* and the plurality of second measuring units 21*a–d* and funnel the information to one (or a few) centralized location(s) for analysis, such as the remote processor 30. The network may comprise the plurality of sensors disposed on the plurality of first measuring units 20*a–f* and the plurality of second measuring units 21*a–d*. As described above, the sensors may be adapted to measure one or more parameters of interest. The sensors may be incorporated into the network hardware so as to be in communication with, and transmit data to, the remote processor 30.

In one embodiment, the network may comprise three tiers. The first (lowest) tier may be the plurality of first measuring units 20*a–f* and the plurality of second measuring units 21*a–d*, where each of the plurality of first and second measuring units 20*a–f*, 21*a–d* may comprise a sensor. The second tier of the network may comprise the plurality of routers 55*a*, 55*b*, which may be adapted to communicate wirelessly with the plurality of first and second measuring units 20*a–f*, 21*a–d* and to transmit the data upstream to at least one local processor (e.g., gateway) 50.

The local processor 50 may be in communication with the remote processor 30. Preferably, the number of the plurality of first measuring units 20*a–f* and the number of the plurality of second measuring units 21*a–d* may be greater than the number of routers 55*a*, 55*b*, which may be greater than the number of local processors 50. Also preferably, the number of local processors 50 may be equal to or greater than the number of remote processors 30. Thus, in an embodiment, data is funneled upstream from the plurality of first and second measuring units 20*a–f*, 21*a–d* to the remote processor 30.

Each individual component of the network described above may communicate wirelessly. One such wireless embodiment (e.g., a wireless mesh network) may be available commercially from, for example, Millennial Net; Cambridge, Mass.

As described above, the connection between the plurality of first and second measuring units 20*a–f*, 21*a–d* and the plurality of routers 55*a*, 55*b* may be wireless. For wireless communication, each of the plurality of first and second measuring units 20*a–f*, 21*a–d* may be within a certain distance of each of the plurality of routers 55*a*, 55*b*. For example, in an embodiment, each of the routers 55*a*, 55*b* should be within 30 feet of each of the plurality of first measuring units 20*a–f*.

In some cases, the routers 55*a*, 55*b* should be closer to the plurality of first measuring units 20*a–f*, as for example, where there are walls (e.g., interior walls 16) or other barriers between the routers 55*a*, 55*b* and the plurality of first measuring units 20*a–f*. Thus, in an embodiment, the routers 55*a*, 55*b* may be placed where they are close enough to receive the signals from the plurality of first measuring units 20*a–f*. Also, the routers 55*a*, 55*b* may be placed in an open area to promote signal reception, but not necessarily in plain view of individuals.

In an embodiment, the routers 55*a*, 55*b* may comprise a printed circuit board, a means to receive wireless transmissions, such as an antenna or the like, and a power source. The routers 55*a*, 55*b* may be placed in a position to receive signals from the plurality of first measuring units 20*a–f*. In one embodiment, each one of the routers 55*a*, 55*b* may accept signals from up to five measuring units 20, 21. In another embodiment, each one of the routers 55*a*, 55*b* may accept signals from up to 20 measuring units 20, 21. In still another embodiment, each one of the routers 55*a*, 55*b* may accept signals from up to 100 measuring units 20, 21.

The maximum number of measuring units 20, 21 that can be used in the system 10 can be a function of several variables including the total number of measuring units 20, 21 in the network, the information density, as well as the distance between the components of the network.

For example, using an 8-bit processor, the maximum number of measuring units 20, 21 may be calculated by subtracting the number of routers 55 and local processors 50 (e.g., gateway) from 65025, which may be standard for a particular 8-bit processor. The number of measuring units 20, 21 may be determined by the processor type (e.g., 8-bit, 12-bit, 16-bit). For example, expansion from an 8-bit processor to a 16-bit processor can exponentially increase the number of measuring units. Additionally, the number of routers 55 is a function of the distance between the router 55 and the measuring units 20, 21 associated with the router 55. The number of local processors 50 (e.g., gateway) may be a function of the distance between the local processor 50 and the routers 55 associated with the local processor 50.

The routers 55*a*, 55*b* may be placed out of plain view, but are generally positioned in a place that is accessible for routine maintenance. Thus, while the routers 55*a*, 55*b* may connected to an electrical circuit disposed in the building 11, the power source for the routers 55*a*, 55*b* may comprise batteries, or other suitable power supply, such as a solar cell. Although batteries may be selected for long-lifetimes, in one embodiment, standard AA batteries may be used.

In an embodiment, the plurality of first measuring units 20*a–f* may be connected to the local processor 50, which may allow data to be communicated to the remote processor 30. In an embodiment, local processor 50 may comprises its own processor (not shown), which may control data acquisition, data processing, and sending the data upstream to the remote processor 30. Alternatively and/or additionally, the local processor 50 may be directly connected to a desktop personal computer (PC) (not shown) via a serial port (not shown). In this way, data from the local processor 50 may be downloaded to the desktop computer.

In an embodiment, the number of routers 55*a*, 55*b* may be a function of the distance between each of the routers 55*a*, 55*b* and the first and second measuring units 20*a–f*, 21*a–d* associated with each router 55*a*, 55*b*. The number of local processors 50 may be a function of the distance between a local processor 50 and the router 55*a*, 55*b* associated with the local processor 50. The local processor 50 may receive data from a finite number of first and second measuring units 20*a–f*, 21*a–d*.

In an embodiment, the local processor 50 can accommodate data from over 50 measuring units 20, 21. In another embodiment, the local processor 50 can accommodate data from over 100 measuring units 20, 21. In still another embodiment, the local processor 50 can accommodate data from over 250 measuring units 20, 21. Also, in an embodiment, the local processor 50 can handle data from a router 55*a*, 55*b* that is up to 100 feet away. Thus, a single local processor 50 may handle all of the measuring units 20, 21 for the entire building 11.

The remote processor 30 may comprise a computer-readable medium on which is encoded instructions that may control various aspects of the system 10. For example, in an embodiment, the computer-readable medium may control the time intervals between data acquisition. Also, the computer readable medium may periodically (such as substantially continuously) log data acquired by the system 10 and compare the data to previously acquired data such that a change in conditions for at least one of the sites of interest can be ascertained. Also, in an embodiment, a signal may be generated when the data from a particular sensor is out of range with values from other sensors, out of range from a predetermined level, or within a percentage of a maximum set point.

The system 10 is able to monitor a plurality of sensors, and generate an alarm or warning signal when a situation comprising a high risk is occurring or may be trending toward a predetermined set point. For example, in an embodiment, the system 10 may generate an alarm signal when a sensor has a reading that is out of line with similarly placed sensors. In an embodiment, the signal comprises an electronic transmission, an audible alarm, or a visual readout on a printer or monitor. For example, the alarm may comprise an e-mail alert, an e-mail with attachments, a file transfer protocol (FTP), a text message communicated wirelessly to a device such as a mobile telephone, pager, or the like.

Also, in an embodiment, the measuring units 20,21 may include location as a parameter evaluated by the remote processor 30. Preferably, one of the parameters describing location comprises elevation, where elevation comprises the relative directionality of the sensor: North (N), Northwest (NW), West (W), Southwest (SW), South (S), Southeast (SE), East (E), and Northeast (NE). In an embodiment, the sensor may comprise an altitude sensor that can measure pressure differentials such as the height of the sensor above sea level. In this way, the data from one sensor may be compared to sensors located in similar environments.

Each sensor may be adapted to respond to the parameter of interest. Each sensor may be interfaced with other portions of the system 10. In one embodiment, a printed circuit board (not shown) may be used to interface each sensor with the system 10. The printed circuit board may comprise a processor comprising a computer-readable medium that may be adapted to interpret the signals from the sensors and to transform the signals into a form that may be communicated by the system 10.

In an embodiment, the interface board may comprise a schotke diode (not shown). In addition to its usual function of preventing incorrect battery connection, the diode may be used to make the voltage across the battery compatible with the rest of the system 10. As described above, a lithium chloride ($LiCl_2$) battery may be used for the first and second measuring units 20, 21 (including sensors) to provide a self-contained power source that may last as long as ten years. In some cases, the voltage across the lithium chloride battery may be higher that that being used for the sensor board. Thus, the diode may be used to drop the voltage to a sensor that is compatible with the sensor. For example, in one embodiment of the system, a diode may be used to drop 0.3 volts from the lithium chloride battery used for the sensor board.

The lifetime of the power unit for the first and second measuring units 20, 21 may be optimized by having the measuring units 20, 21 "sleep" between measurements. Where the average sampling time is about 90 milliseconds or less, the measuring units 20, 21 may sleep for over 80% of their use. For example, in an embodiment, the sleep time will be 82% of the interval time when set at the most frequent reading interval of 500 milliseconds. At an interval between samplings of once every 90 minutes the sleep time percentage would be 99.9% of the cycle time between readings. In an embodiment, power used by the sensor may be controlled separately from an endpoint (e.g., sensor of measuring units 20, 21) of the system 10.

As described above, data gathered from the plurality of first and second measuring units 20*a–f*, 21*a–d* may be transmitted via routers 55*a*, 55*b* and the local processor 50 (e.g., gateway) to the remote processor 30 for compilation and analysis. The remote processor 30 may be remote from the local processor 50 and its associated network. The remote processor 30 may be disposed in operative communication with the local processor 50, the first and second monitoring units 20*a–f*, 21*a–d*, and routers 55*a*, 55*b*.

The connection from the various components of the system 10 to the remote processor 30 may comprise a variety of technologies known in the art. For example, the system 10 and the remote processor 30 may be connected via a direct connection, such as broadband internet connection or via a modem or via a wireless connection, such as cellular technology.

The remote processor 30 may comprise a variety of functions. First, the remote processor 30 may be used to compile and organize data gathered from the plurality of measuring units 20, 21. Thus, in an embodiment, incoming data may be organized and displayed in a variety of formats. The remote processor 30 may communicate data to an FTP server (not shown), from which the data may be stored in a database 35 for future use, data trending, and predictive modeling.

The present invention describes a computer program or software designed to couple the sensors of the monitoring units 20, 21 and networking hardware (e.g., local processor 50 and routers 55*a*, 55*b*) as a coordinated system designed for remote monitoring at specific sites, such as the windows 15*a–e* of the building 11. As used herein, a computer program comprises a computer-encoded language or a computer-readable medium that encodes the steps required for the computer to perform a specific task or tasks. Also, as used herein, software comprises the computer program(s) used in conjunction with any other operating systems required for computer function.

In an embodiment, the software of the present invention allows a user control over each one of the plurality of first and second monitoring units 20*a–f*, 21*a–d*. Thus, in contrast to previously described systems, the present invention allows a user to remotely adjust the measurements taken from each one of the plurality of first and second measuring units 20*a–f*, 21*a–d*.

In one embodiment, the software may be used to change a sampling interval. For example, sampling may be changed from being taken every 500 milliseconds to once every 90 minutes. In another embodiment, the software may be programmed to control independently each one of the plurality of first and second measuring units 20*a–f*, 21*a–d*. For example, it may be desirable to monitor a particular site more frequently than another site, such as for example where a particular window unit shows an indication of drifting out of range. The monitoring frequency can be dynamically adjusted by a user remote from the measuring units 20, 21, as well as remote from the building 11.

In an embodiment, sensor readings may be communicated to the remote processor 30, as they are taken or shortly thereafter. Alternatively, the sensor readings can be communicated periodically to the remote processor 30. For example, readings may be communicated to the remote processor 30 about every second to any interval greater than this. Thus, sensor readings may be communicated to the remote processor 30 hourly, daily, monthly, annually, or at another desired interval.

In an embodiment, the system functions automatically until there is some type of intervention from a system operator (i.e., user). For example, the software may be programmed to take one reading every 1 minute from endpoint/sensors at location 1, and one reading every 3 minutes from endpoint/sensors at location 2, and one reading every 10 minutes for endpoint/sensors at location 3, except for a subset of location 3 sensors, for which readings are taken every 20 seconds. If at any point, the number or type of readings needs to be adjusted, this may be done remotely by an operator via the central processing unit.

In one embodiment, the program recognizes certain predetermined limits (e.g., set points) and triggers an alarm if any one sensor has a reading (or multiple readings) that are outside of or approaching an allowed range or set point. Thus, the system 10 may substantially continuously record data from a sensor, and compile the data. If the readings are within a predetermined range, the system 10 will maintain itself under the current settings.

If there is a reading or several readings that are outside of an allowed range or trending toward a set point, an alarm signal may be communicated to an operator or other user. For example, the signal may comprise an audible alarm. Alternatively, the signal may comprise a digital printout on a computer monitor or a computer screen. Or, the signal may comprise an electronic notification such as a text message sent via e-mail, cell phone, or the like. There may be a variety of signals that set off an alarm, or alarm-type signal. For example, in an embodiment, a particularly extreme temperature reading or humidity setting from a sensor may trigger an alarm. Alternatively, an alarm may be triggered by a low battery level for a particular measuring unit 20, 21.

Readings from the plurality of first measuring units 20*a–f* in similar environments (e.g., elevations) may be compared to determine a range of expected readings. Alternatively, readings from all of the first and second measuring units 20*a–f*, 21*a–e* are compared. The allowable range or set points may be adjusted or modified by an operator or other user (e.g., via the remote processor 30) as needed.

Also, an alarm may be triggered by an event which can be monitored as an "on-off" type situation. For example, in an embodiment, an alarm may be triggered by the opening or breaking of a window. Thus, in an embodiment, a sensor may be set to monitor for a contact closed or opened condition. In the case of breaking glass, if a sensor was set to record the noise generated by breaking glass, it could typically be set in the normally closed condition and the noise would cause the device to open the contact and trigger the alarm.

Once an alarm is triggered, the data in the system may be accessed in whatever manner is necessary to perform a meaningful analysis. For example, for the case where a low temperature reading is recorded, the data may be compared to an exterior reading from the same building and/or elevation. This analysis could be used to determine if the aberrant reading is due to a loss of window integrity, or for other, more global reasons (e.g., such as a sudden temperature shift). The analysis may be user controlled, in that the user may specify the data logs to be pulled and the type of analysis to be performed. Alternatively, and/or additionally, the analysis may computer-implemented in that a series of predetermined analytical steps are performed in response to a certain triggering event.

Figure 2:
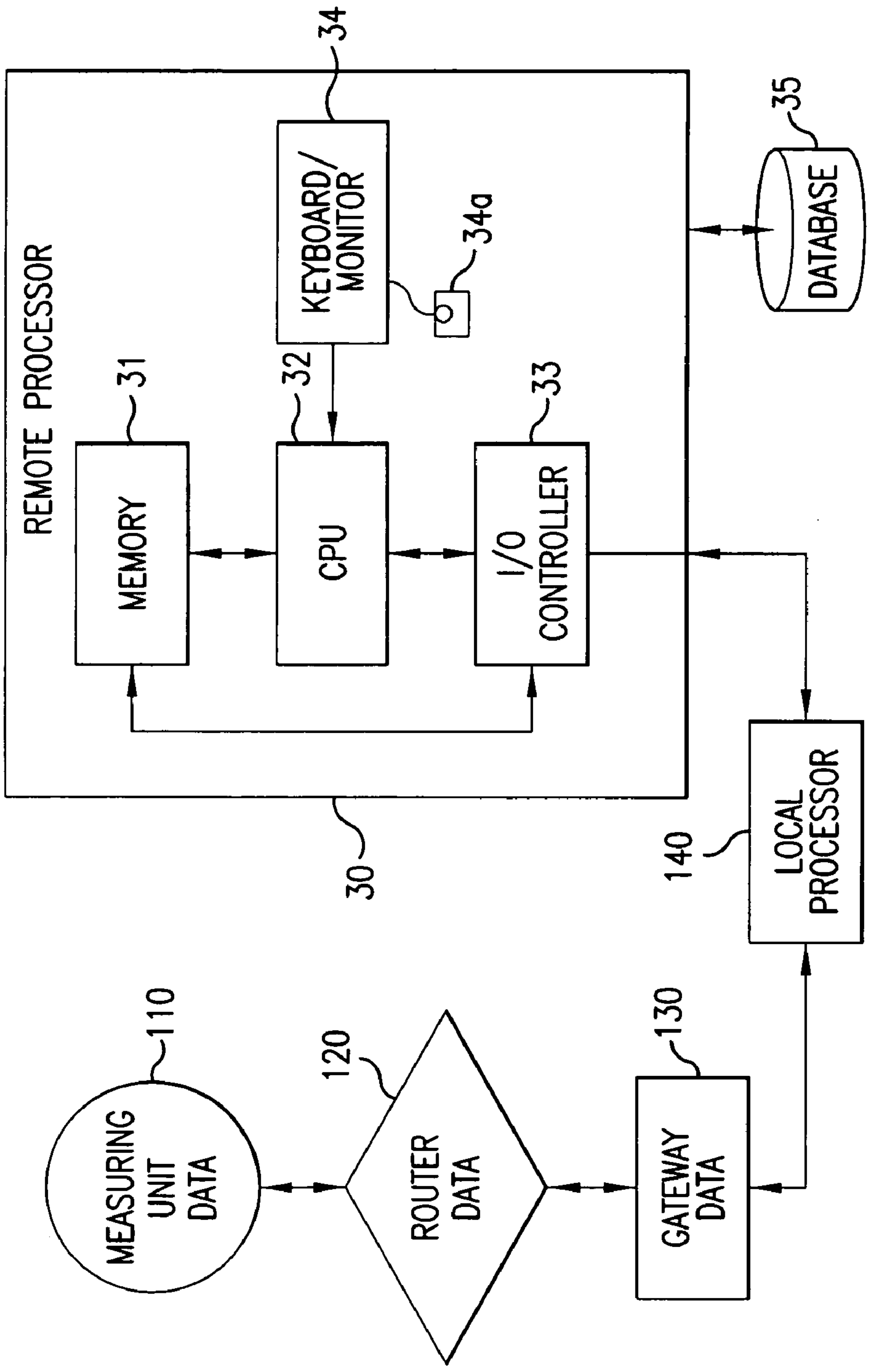
FIG. 2 shows a schematic drawing of information flow in the system of FIG. 1.

Referring now to FIG. 2, a schematic showing the flow of information 100 through the system 10 is shown. As indicated by the connecting lines, information flow throughout the system 10 is two-way. Additionally, such information flow may be by wireless means. Measuring unit data 110 (which may comprise sensor data regarding a physical or chemical parameter) may be communicated to a router, such as routers 55*a*, 55*b* described above. Router data 120 may then be communicated to a gateway.

Data or signals transmitted or communicated to the routers and/or gateway may be stored, modified, or processed, such as signal amplification or modulation. The gateway data 130 may be communicated to a remote processor, such as the remote processor 30 described above, through a local processor, such as the local processor 50 described. Alternatively, the gateway data 130 may be communicated directly (not shown) to the remote processor. The gateway may be serially connected to the local processor, and the local processor data 140 transmitted to the remote processor 30 via the Internet, modem, wirelessly or other means standard in the art to a computer or server at a remote location. The local processor data 140 may be displayed or accessed by a user directly from the local processor.

An operator or user may access data stored by the remote processor 30 (at a central location or remote from the remote processor) by entering instructions (including sampling intervals, alarm settings, sampling types, and the like) via a keyboard 34, mouse 34*a* or other access means. These instructions may then be communicated through the network such that the sensors are controlled remotely. Data may be stored by the remote processor 30 using a storage device common in the art such as disks, drives or memory 31. As is understood in the art, a central processing unit 32 and an input/output (I/O) controller 33 may be required for multiple aspects of the functioning of the remote processor 30. Also, in an embodiment, there may be more than one processor.

A user may access data in a variety of ways and the data may be viewed in a variety of formats. Different users may have different rights or access to the information. For example, some users may have read-only rights limited information, whereas others may have access all information as well as to control the sensors (as described above). In one embodiment, a user may access the data directly from the remote processor 30. Alternatively, the remote processor 30 may communicate the data to a plurality of user terminals (not shown).

The data may be organized on various levels to facilitate analysis. For example, data may be monitored by sensor group. Alternatively and/or additionally, the data may be monitored by sensor azimuth. Alternatively and/or additionally, comparative data is monitored.

In an embodiment, at least one all inclusive file, containing all the accumulated data from every sensor, may be maintained. This data file may provide an archive, which may be accessed at any time for information that may be required for a particular analysis.

Also, a file for all interior sensors may be maintained. In one such way, different interiors may be compared to each other, independent of other variables. For example, the data for all the sensors in a particular region of the country may be compared. Alternatively, and/or additionally, the data for all the sensors in one building may be compared.

Also, individual endpoint files, organized by unique sensor identifier may be maintained. The profile for each individual sensor may be compared to itself over time, to look for trends indicative of a problem, or the profile may be compared to profiles of other sensors to detect any deviation from the ranges considered to be acceptable.

In one embodiment, data for a particular site may be accessed by a user through the Internet. A user may access particular data with a username and a password. Data may be presented to a user in one or more formats. For example, as shown in FIG. 3, data may be presented in a raw data or unprocessed format.

The raw data may be presented to a user in a data table 150. The data may comprise various information in various fields of the data table 150. For example, the data table 150 may comprise a date field 151, a time field 152, a measuring unit identification (ID) field 153. Each measuring unit or sensor may be assigned a unique identifier. The table 150 may also comprise a type field 154, which may refer to a the data or parameter type (e.g., temperature, humidity, and or relative humidity; raw data value or converted value).

The table 150 may comprise an elevation field 155, referring to a physical location of the sensor. The table 150 may comprise a sample interval field 156, which may identify the sampling interval used for a particular sensor. Other fields of the table 150 may comprise a battery field 157 (displaying battery voltage), a temperature field 158 (displaying a reading from a temperature sensor), and a humidity field 159 (displaying a reading from a humidity sensor). Other suitable fields may be used.

Figure 4A:
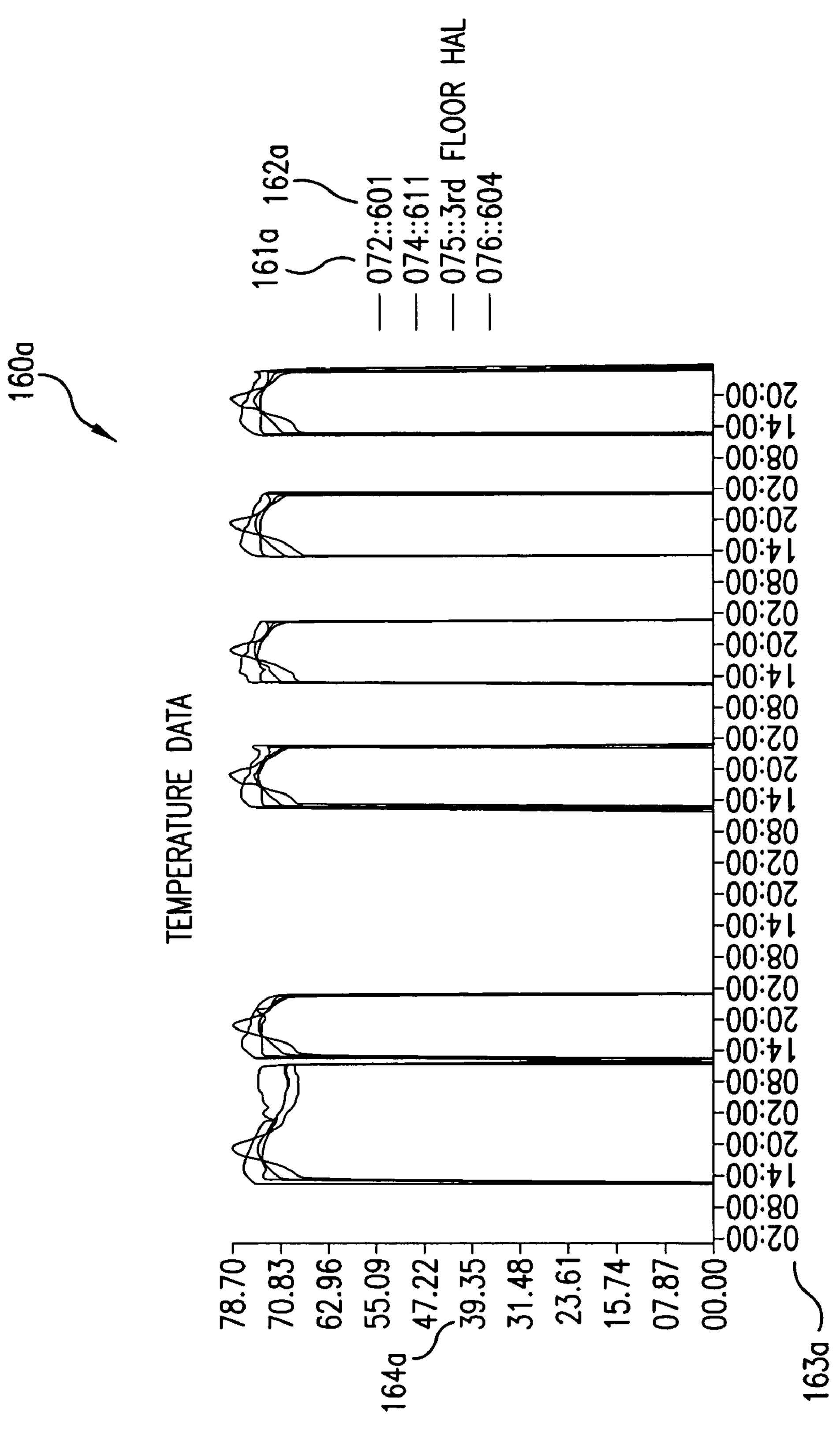
FIGS. 4A and 4B show line charts of data compiled from a system according to another embodiment of the present invention.
Figure 4B:
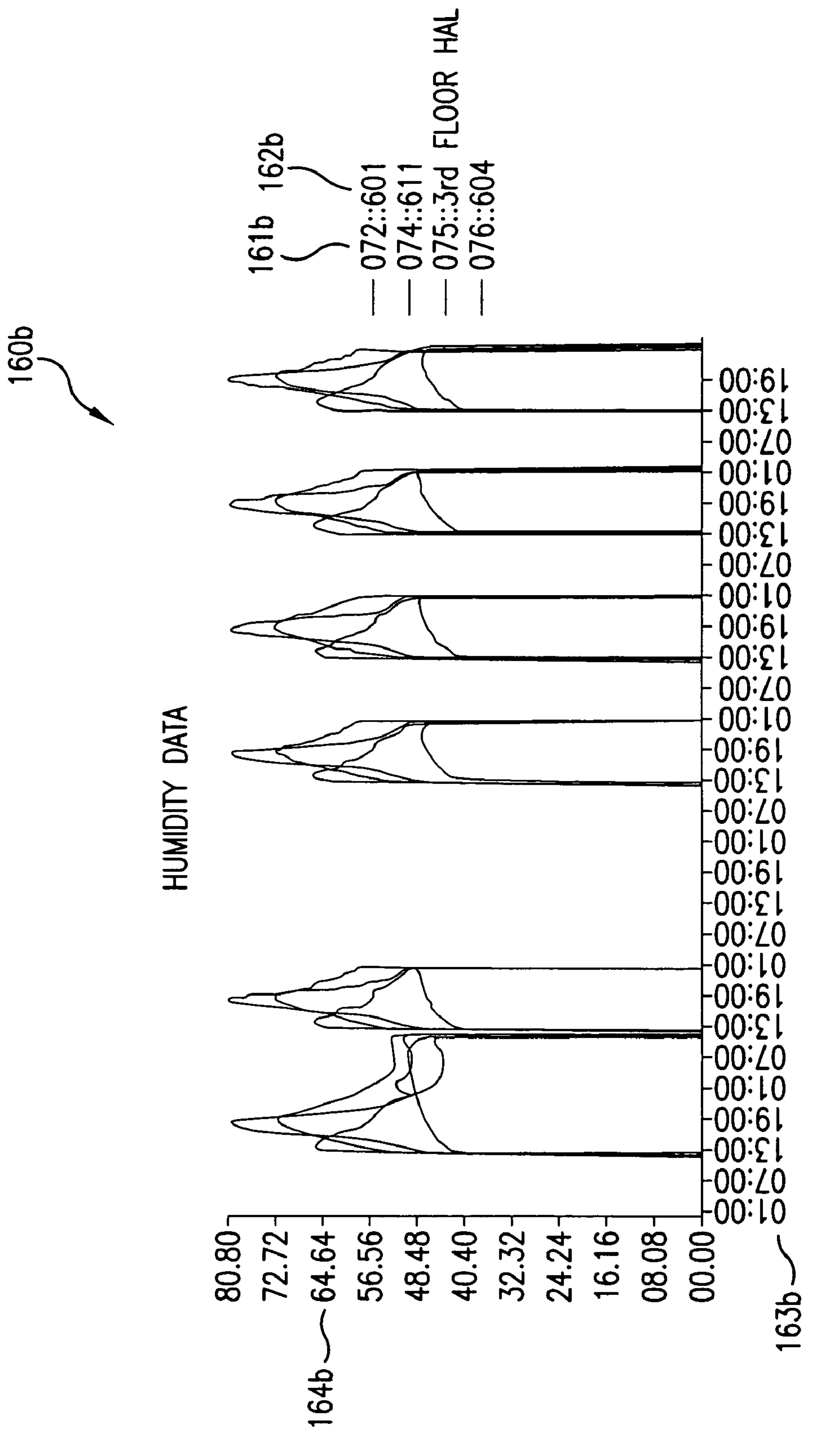

Referring now to FIG. 4, another format for presenting data is shown. Sensor data may be presented in one or more line charts 160*a,b*. The line charts 160*a,b* may present information in several ways, such as for example, sensor identifier 161*a,b*, sensor location 162*a,b*, time interval 163*a, b*, and sensor reading 164*a,b*.

Line chart 160*a* displays temperature data for several sensors 161*a* and their respective locations 162*a*. The user may modify which sensors 161*a* to display in the chart 160*a*. The user may also select or modify the time interval 163*a* to be displayed in the chart 160*a*. The line chart 160*b* displays humidity data corresponding to the temperature data displayed in line chart 160*a*. The charts 160*a,b* may facilitate identification by a user of data trends that may not be apparent from viewing raw data, such as that described above with reference to FIG. 3.

Figure 5:
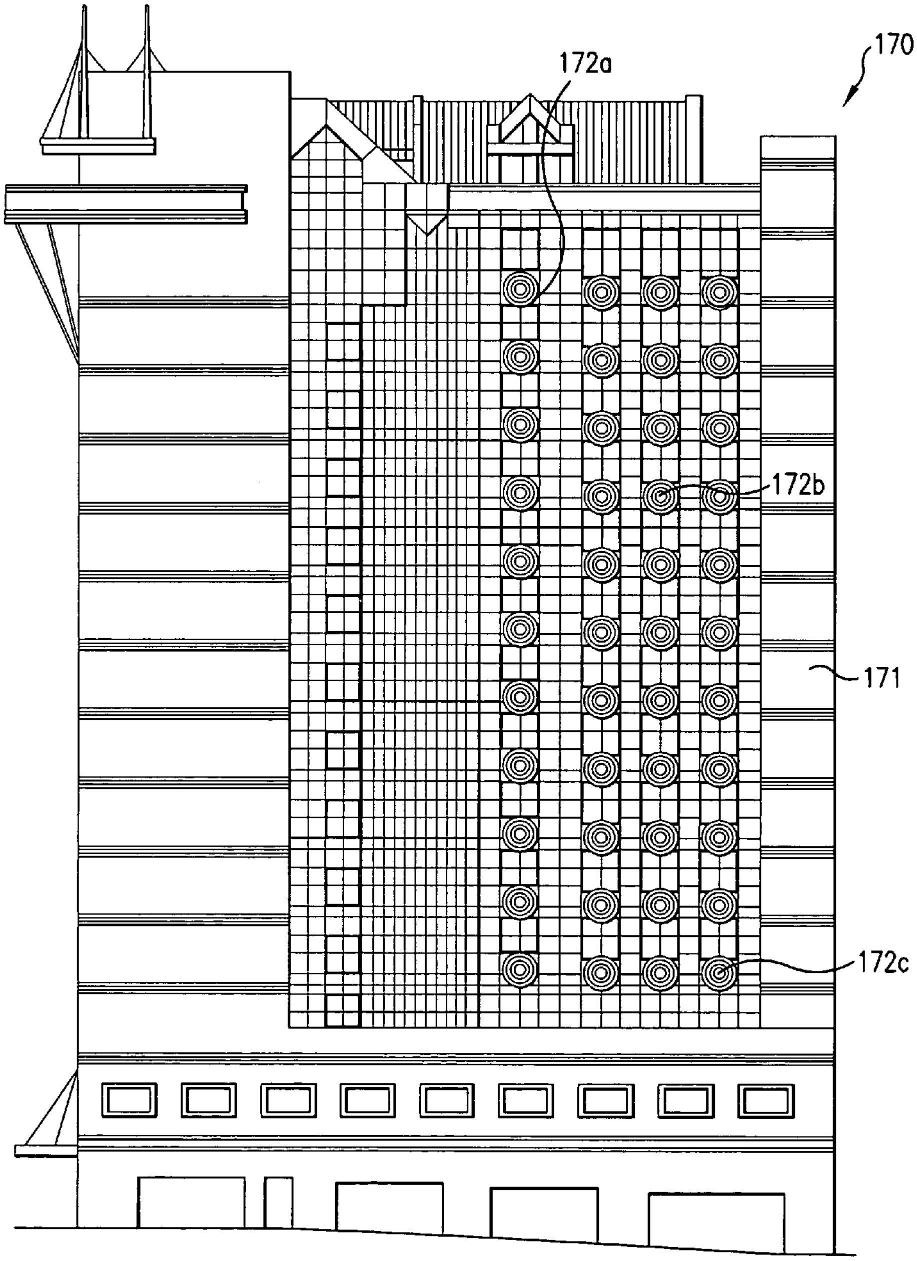
FIG. 5 shows a graphical representation of data compiled from a system according to still another embodiment of the present invention.
Figure 6:
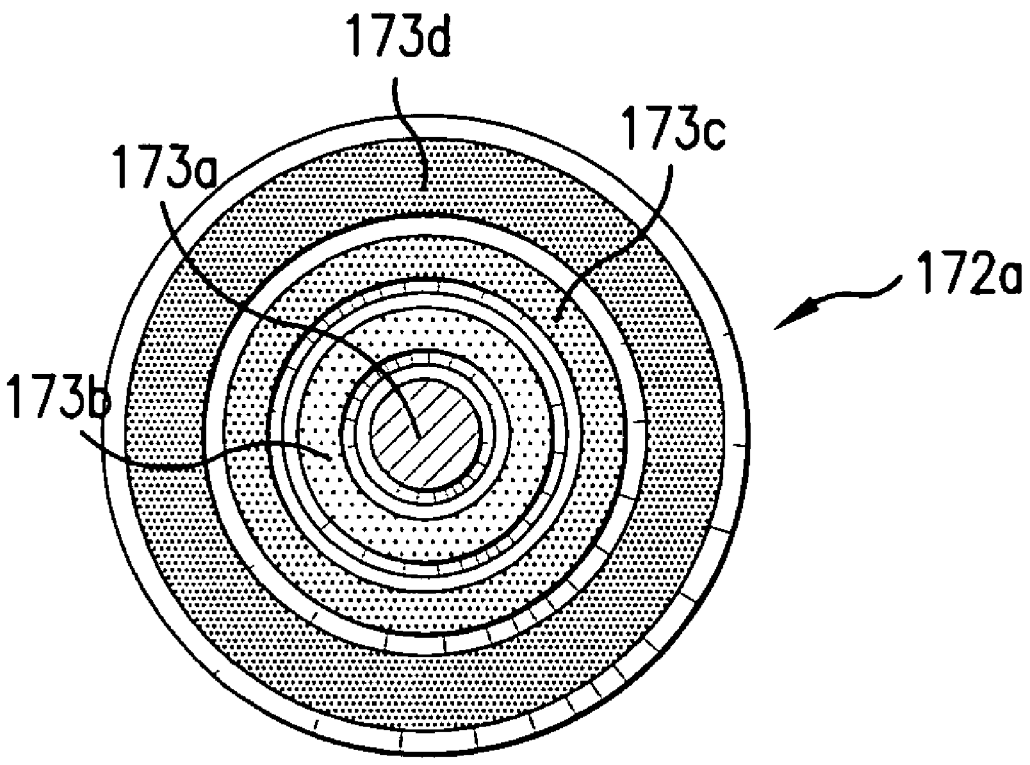
FIG. 6 shows a data circle of the graphical representation of FIG. 5.

Referring now to FIGS. 5 and 6, still another format for presenting data is shown. FIG. 5 shows a graphical representation 170 of the data. The graphical representation 170 shows a representation of a building skin 171 (or facade) for a particular elevation. Data may be represented as a series of concentric circles or rings, such as shown by data circles 172*a–c*. The data circles 172*a–c* may be superposed on the building skin 171. The data circles 172*a–c* may be placed on the building skin 171 proximate to the position of a particular sensor (not shown) and/or measuring unit (not shown). Sensor readings for different parameters may be viewed on other views of the building skin (not shown).

FIG. 6 shows a larger view of the data circle 172*a*. The data circle 172*a* comprises an inner circle 173*a* surrounded by a plurality of concentric rings 173*b–d*. The inner circle 173*a* and each of the rings 173*b–d* may correspond to a particular time that a sensor reading of one or more parameters is taken or recorded. For example, circle 173*a* may represent a first reading at a first time. A second reading by the sensor at a second time may be indicated by ring 173*b*. A third reading by the sensor at a third time may be indicated by ring 173*c*, and so forth.

In one embodiment, a value of a parameter, such as temperature, may be associated with a size of the circle 173*a* and the rings 173*b–d*. For example, a size of the ring 173*d* is greater than a size of the ring 173*b*. The size of each of the rings 173*b–d* may be measured as a distance from an inner diameter and an outer diameter of each of the rings 173*b–d*. The size of the circle 173*a* may be its diameter. In the example shown in FIG. 6, the value of the temperature associated with the ring 173*d* would be greater than the value of the temperature associated with the ring 173*b*.

A value of another parameter, such as humidity, may be associated with a particular coloring, shading, or patterning of the circle 173*a* and each of the rings 173*b–d*. Thus, values for two parameters may be shown on the same graphical display. A coloring or shading can show a gradient representative of the condition being monitored.

For example, when displaying humidity readings, black may represent approximately 0% humidity and white may represent approximately 90–100% humidity. Ranges in between 0% and 90–100% may be represented by different colors, or shades of colors, including grayscale. Grayscale is a color mode comprising a plurality of shades of gray. In one embodiment, grayscale may comprise 256 colors, including absolute black, absolute white, and 254 shades of gray in between. Images in grayscale may have 8-bits of information in them. Other suitable geometric shapes, colors, and gradient schemes may be used.

Figure 7:
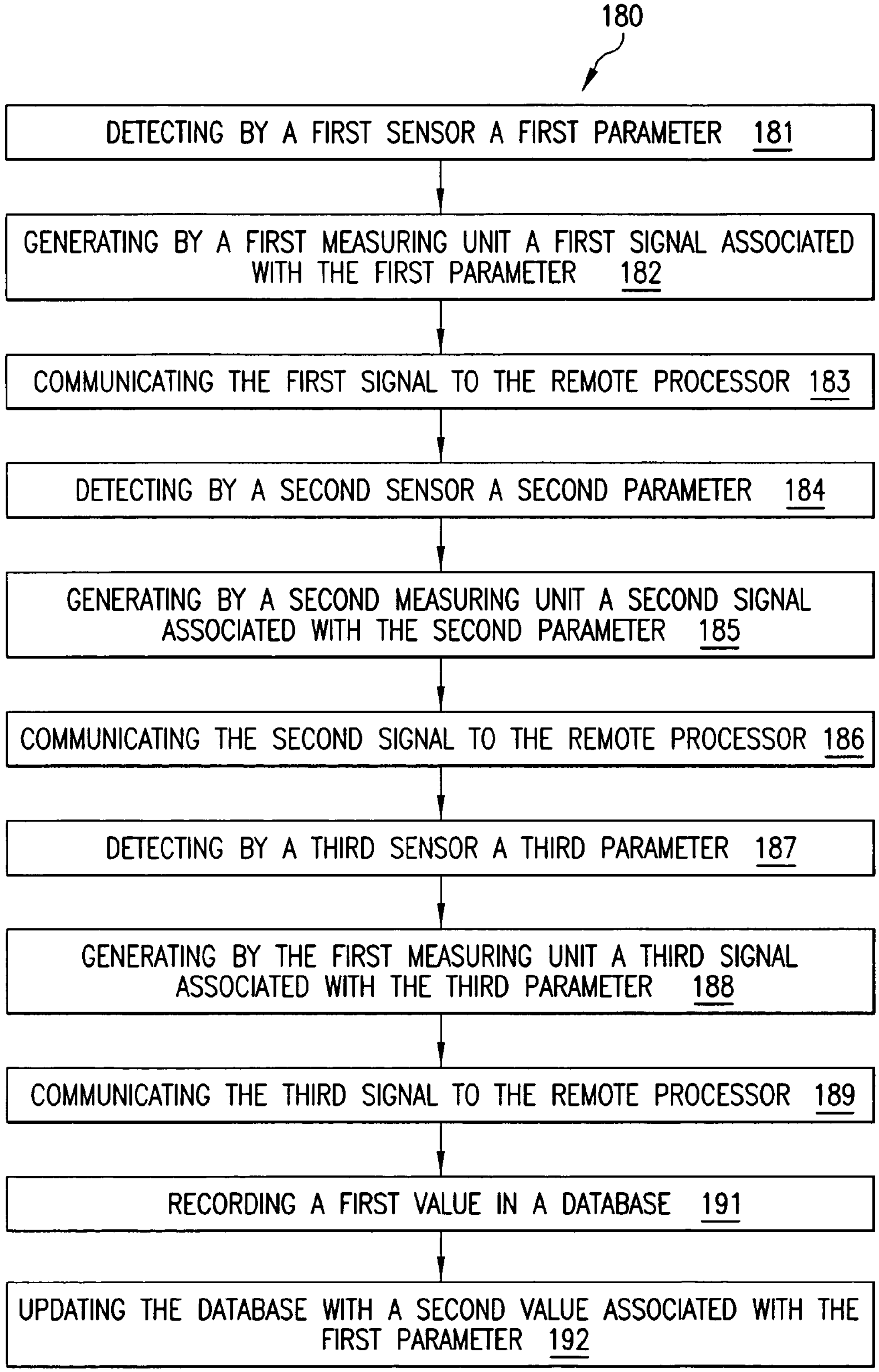
FIG. 7 shows a method according to an embodiment of the present invention.

Referring now to FIG. 7, a method 180 according to an embodiment of the present invention is shown. The method 180 may be employed in a system, as described above. Items shown in FIGS. 1–6 may be referred to in describing FIG. 7 to aid understanding of the embodiment of the method 180 shown and described. However, embodiments of methods according to the present invention are not limited to the embodiments described above.

As indicated by block 181, the method 180 may comprise detecting by a first sensor a first parameter. The first sensor may be disposed in an interior of a structure, such as a building. The structure may comprise an exterior wall comprising a first wall and a second wall. The first sensor may be disposed in a cavity defined by the first wall and the second wall.

The first sensor may comprise a plurality of sensors. The first parameter may comprise a physical and/or chemical parameter. The first parameter may comprise at least one of a temperature, humidity, relative humidity, moisture, stress, strain, position, deformation, vibration, acceleration, pressure, and motion. Alternatively, other suitable parameters may be used.

As indicated by block 182, the method 180 may comprise generating by a first measuring unit a first signal associated with the first parameter. The first sensor may be disposed in communication with the first measuring unit. In one embodiment, the method 180 may comprise providing a local processor in communication with the first measuring unit and a remote processor.

The local processor may be adapted to communicate the first signal with the remote processor. The local processor may be disposed in an interior of the structure. Alternatively the local processor may be disposed proximate to the structure. The remote processor may be proximate to the structure or within the structure. Generally, the remote processor may be physically separate, or remote, from the local processor.

As indicated by block 183, the method 180 may comprise communicating the first signal to the remote processor operable to control the first measuring unit. The remote processor may be disposed in communication with the first measuring unit.

As indicated by block 184, the method 180 may comprise detecting by a second sensor a second parameter. In one embodiment, the second parameter may comprise the physical parameter of the first parameter. Alternatively, the second parameter may be different than the physical parameter of the first parameter. The second sensor may be disposed in communication with the remote processor. The second sensor may be disposed proximate to an exterior of the structure. In one embodiment, the sensor may be coupled with an exterior surface of the structure.

As indicated by block 185, the method 180 may comprise generating by a second measuring unit a second signal associated with the second parameter. The second sensor may be disposed in communication with the second measuring unit. As indicated by block 186, the method 180 may comprise communicating the second signal to the remote processor. The remote processor may be disposed in operative communication with the second measuring unit. In one embodiment, the local processor may be disposed in communication with the second measuring unit. The local processor may be adapted to communicate the second signal to the remote processor.

As indicated by block 187, the method 180 may comprise detecting by a third sensor a third parameter. The third sensor may be disposed in communication with the first measuring unit. In one embodiment, the third parameter may comprise a physical parameter different than the first parameter. The third parameter may comprise at least one of a temperature, humidity, relative humidity, moisture, stress, strain, position, deformation, vibration, acceleration, pressure, and motion.

As indicated by block 188, the method 180 may comprise generating by the first measuring unit a third signal associated with the third parameter. As indicated by block 189, the method 180 may comprise communicating the third signal to the remote processor.

As indicated by block 191, the method 180 may comprise recording a first value in a database. The first value may be associated with the first parameter. The first value may comprise a numerical value for the first parameter, such as moisture content, detected by the first sensor. As indicated by block 192, the method 180 may comprise updating the database with a second value associated with the first parameter. The second value may comprise another numerical value for the first parameter recorded at a time subsequent to a time during which the first value was recorded. The second value may be the same or different than the first value.

In one embodiment, the method 180 may comprise forecasting an event condition based at least in part on the first and second values associated with the first parameter. An event condition may be similar to that described above, such as mold growth in the structure or water damage to the structure or its components. The first and second values may be used in a predictive model to forecast the event condition. In another embodiment, the method 180 may comprise generating an alarm signal when the second value exceeds a predetermined set point. An alarm signal may be generated when the first or second values approach the set point within a predetermined amount, range, or percentage.

Figure 8:
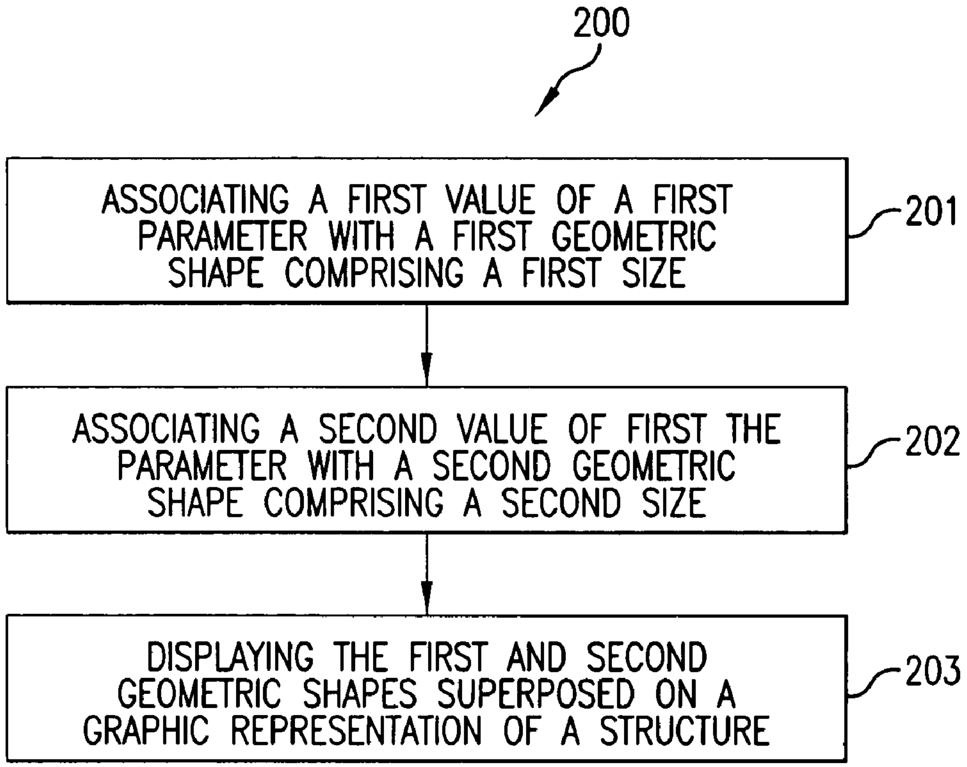
FIG. 8 shows a method according to another embodiment of the present invention.

Referring now to FIG. 8, a method 200 according to an embodiment of the present invention is shown. The method 200 may be employed to generate and/or display the graphical information shown in FIGS. 5–6, and as described above. Items shown in FIGS. 5–6 may be referred to in describing FIG. 8 to aid understanding of the embodiment of the method 200 shown and described. However, embodiments of methods according to the present invention are not limited to the embodiments described herein.

As indicated by block 201, the method 200 may comprise associating a first value of a first parameter measured by a first sensor at a first time with a first geometric shape comprising a first size. The first parameter may comprise a chemical or physical parameter, such as humidity. The first parameter may comprise a physical parameter comprising at least one of a temperature, humidity, relative humidity, moisture, stress, strain, position, deformation, vibration, acceleration, pressure, motion, electrical resistance, and electrical capacitance. Other suitable parameters may be used.

As indicated by block 202, the method 200 may comprise associating a second value of the first parameter measured by the first sensor at a second time with a second geometric shape comprising a second size. The first and second geometric shapes may each comprise a ring. In one embodiment, the second geometric shape may be different than the first geometric shape. For example, the first geometric shape may comprise a circle and the second geometric shape may comprise a ring. The second geometric shape may circumscribe the first geometric shape. The first and second geometric shapes may be concentric with one another.

The first size of the first geometric shape may represent a numerical value associated with the reading from or signal generated by the first sensor at the first time. The second size of the second geometric shape may represent a numerical value associated with the reading from or signal generated by the first sensor at the second time. For example, the first time may be the time of an initial reading, and the second time may be a reading subsequent to the initial reading.

In one embodiment, a value of a temperature reading may be represented by a ring. A size of the ring may vary depending on the numerical value of the temperature. In one embodiment, the size of the ring may be measured as a width, or a difference between an outer diameter and an inner diameter of the ring. In the present example, a larger ring represents a higher temperature than a smaller ring.

As indicated by block 203, the method 200 may comprise displaying the first and second geometric shapes superposed on a graphic representation of a structure. In one embodiment, a position of the displayed first and second geometric shapes may correspond substantially with a position of the first sensor disposed in the structure. An exemplary display may be similar to that shown in FIG. 5. Other suitable displays may be used.

In one embodiment, the method may comprise associating a first value of a second parameter measured by a second sensor at the first time with a first color. The first time of the second sensor reading corresponds substantially with the first time of the first sensor reading. The second parameter may be a different physical parameter than the first parameter. For example, the second parameter may comprise humidity. Different humidity readings may be associated with different colors. For example, the first sensor may indicate a humidity reading of 50% at the first time, which may be associated with a shade of orange.

In another embodiment, the method may comprise associating a second value of the second parameter measured by the second sensor at the second time with a second color. The second time of the second sensor reading corresponds substantially with the second time of the first sensor reading. The second sensor may indicate a humidity reading of 70% at the second time. The second value may be associated with a second color, such as a shade of yellow. The values of the second parameter may be associated with other suitable colors, including a grayscale. Alternatively, the values of the second parameter may be associated with patterns (such as that shown in FIG. 6) and/or shading.

In one embodiment, the method 200 may comprise superposing the first color on the first geometric shape displayed on the graphic representation of the structure. In another embodiment, the method 200 may comprise superposing the second color on the second geometric shape displayed on the graphic representation of the structure. Alternatively, first and second patterns may be superposed on the first and second geometric shapes, respectively. The displayed data may be positioned such that they generally correspond to a location of the sensors in the structure.

Thus, two different parameters, e.g., temperature and humidity, may be displayed on one graphic representation of a structure being monitored, and changes to these parameters may be observed (e.g., temperature as a size of ring and humidity as a color or pattern) in a format different than traditional charts and graphs. Such a display may be more easily understood and may facilitate analysis and/or identification of trends in the monitored parameters.

A computer-readable medium of a server device, processor, or other device or application comprises instructions, that when executed, causes the server device, application, processor or other device or application to perform method 200. The server device, resource regulating application, and the computer-readable medium may be similar to that described above. Alternatively, other suitable server devices, applications, computer-readable media, processors, or other devices or applications can be used.

EXAMPLES

The present invention may be better understood by reference to the following examples, which describe working embodiments of the present invention.

Example 1

Wireless Network for Temperature and Humidity Monitoring

A wireless network was purchased from Millennial Net (Cambridge, Mass.). The topology supported using such a network includes star-mesh topology, simple mesh topology, linear topology, and simple star network topology. The network of the present example comprises three levels: (1) endpoints; (2) routers; and (3) gateways.

A. Endpoint (iBean)

An endpoint (also referred to herein as an iBean or bean) provides a wireless capability to a device (such as a sensor) that can communicate with the endpoint vial analog and/or digital I/O. Each endpoint is sized to be able to fit inside of an actuator or sensor. For the system used in these examples, a second board having a temperature/humidity sensor was coupled to the iBean.

The endpoint/sensor was powered by a lithium chloride battery. Using an intermittent sampling program of the sensor/iBean software, the battery should have a lifetime of up to 10 years. The endpoints are able to run on various license-free ISM (industrial, scientific, and medical) radio bands available worldwide. Also, an Application Programmer Interface (API) is available for customization of user applications for processing any device data that the endpoint receives. The iBean endpoint includes 4 digital I/Os and 4 analog I/Os for communication with a sensor.

B. Router

A router provides greater range for wireless transmission of the endpoints. Each router also provides alternate route paths for redundancy in case of obstacle obstruction, network congestion, or interference. As described herein, a router can receive signals from endpoints positioned within approximately 30 feet of the router.

C. Gateway

A gateway provides an interface to communicate with a personal computer or network. The communication can be via a host computer, via a LAN, or via the Internet. Each gateway collects data from the network of routers and/or endpoints and acts as a portal. A gateway can handle signals from approximately over 200 iBeans.

Example 2

Temperature/Humidity Sensors

An SHT1x/SHT7x Sensirion Humidity & Temperature Sensor (Sensirion; Zurich, Switzerland) was serially connected to each iBean. Additionally, an analog sensor (which measures voltage changes), and digital (on/off sensing device) may be used. The SHT7X/SHT1 sensor may require 4 signals: (1) a serial clock input; (2) a power supply input; (3) a ground; and (4) a data I/O. The clock is used to synchronize the communication between the iBean and the sensor. As only two digital I/Os from the iBean are required for implementation, four analog I/Os and two digital I/Os on the iBean are still available for other uses.

The Sensirion SHTxx series of sensors are single chip humidity and temperature multi-sensor modules comprising a calibrated digital output. The sensors comprise a capacitive polymer sensing element for monitoring relative humidity and a bandgap temperature sensor. Both are coupled to a 14-bit analog to digital (A/D) converter and a serial interface circuit on the same chip. The calibration coefficients for the sensor are programmed into the OTP (one-time programmable) memory. These coefficients are used internally during measurements to calibrate the signals from the sensors.

The SHTxx sensors require a voltage supply between 2.4 and 5.5 volts. After power up the device needs 11 milliseconds to reach its "sleep state." Once the sensor has been powered up, and has reached its sleep state, it is ready for use.

Example 3

The Sensor/iBean Interface

An interface board can connect the sensor chip to the network. The interface board may be comprised of a printed-circuit board comprising at least one sensor, such as a pressure sensor (e.g., 4 INCH-D-CGRADE-MV, available from All Sensors of San Jose, Calif.), an ultraviolet (UV) photodiode (e.g., Type PDU-S101, manufactured by Photonic Detectors, Inc.), and discrete temperature sensors (e.g., TC 1046, manufactured by Microchip).

A software program may convert the raw sensor data to values for temperature and relative (or absolute) humidity. The actual software program depends on the sensor used. For example, Sensirion provides specific formulas to convert raw data (sensor output=SO) to humidity based on the number of bits (8 or 12) used to collect the humidity data ($RH_{linear}=c_1+c_2*SO_{RH}+c_3*(SO_{RH})^2$; where $c_1$, $c_2$ and $C_3$ vary with the number bits collected for relative humidity), as well as formulas to convert from raw data to temperature ($T=d_1+d_2*SO_T$; where $d_1$ and $d_2$ vary with the bits collected for temperature).

Millennial Net provides a similar set of formulas. It is assumed that temperature utilizes 12-bits of information and humidity utilizes 8-bits. To compensate for the non-linearity of humidity on the sensor, the raw humidity data is converted using the following formula: Relative Humidity=$(-)4+0.648*(\text{raw data})+(-7.2)e^{-4}*(\text{raw data})^2$. To convert the raw data to temperature, the following conversion is used: Temperature (° F.)=(−)39.28+0.72*(raw data). Other sensors may have similar conversion formulas. The system works using both the Sensirion formula and the Millennial formula in conjunction with each other.

Example 4 iMon Software

A browser-based monitoring software, such as iMon (commercially available from developer, eIQnetworks, Inc.) facilitates the monitoring, control, setup, alarm, and notification. The iMon software program controls each iBean sensor. iBeans are also configured and accessed via the iMon software application. All sensor data received from the iBean is interpreted and stored by iMon.

A. Logging Specification

Logging of collected data is one component of the iMon software program that controls iBean sensors. Each iBean is configured and accessed via the iMon software application. Sensor data received from the iBean is interpreted and stored by iMon. This example describes the functionality of the logging component of iMon and user interface changes which result.

Figure 9:
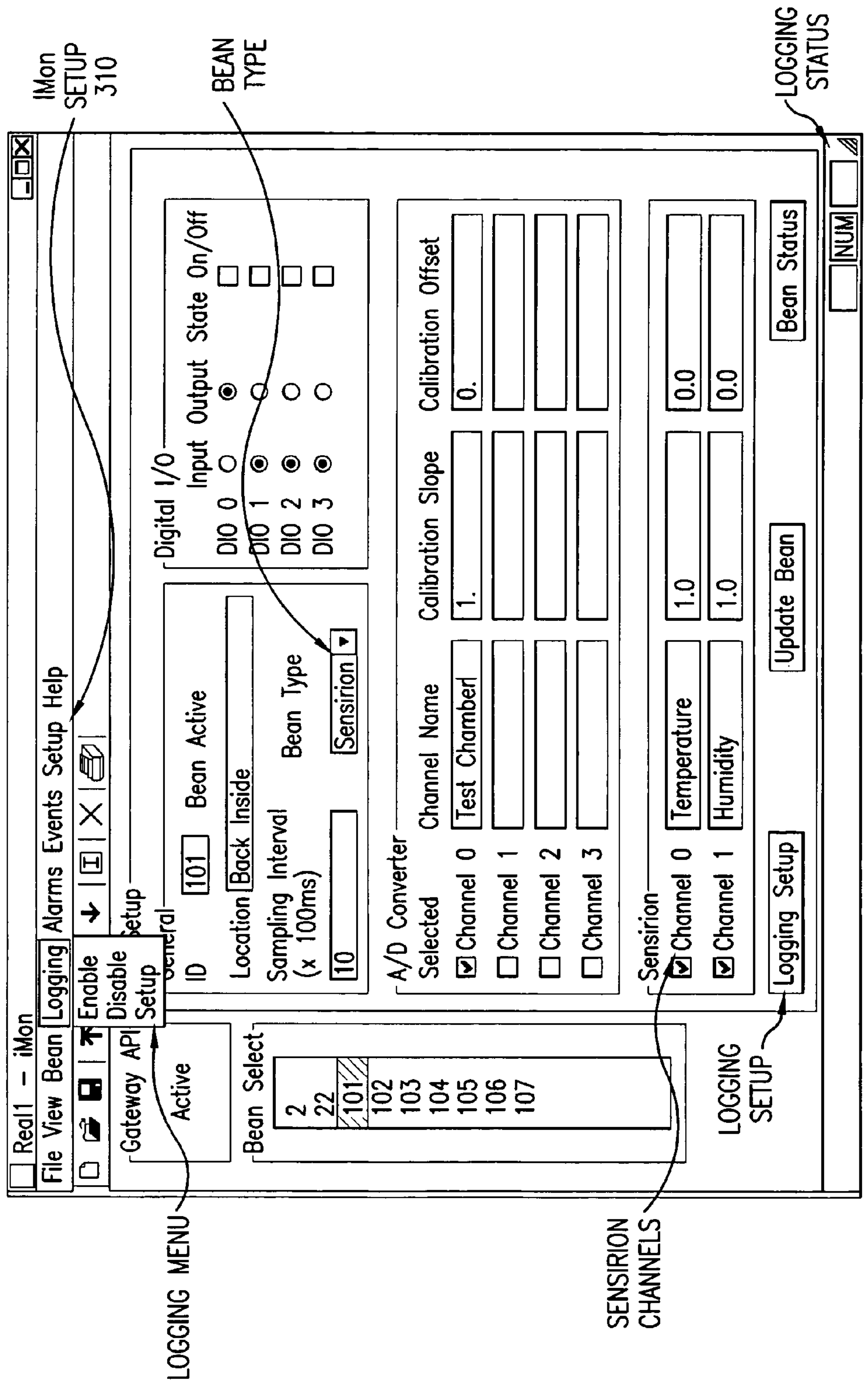
FIG. 9 shows a user interface according to an embodiment of the present invention.

1. User Interface iMon's user interface may change in the following areas: logging menu, Bean logging setup, logging status bar indicator, and iMon setup. FIG. 9 shows an exemplary Graphical User Interface (GUI) and some of the panels describing the system setup.

2. Logging Menu

Figure 10:
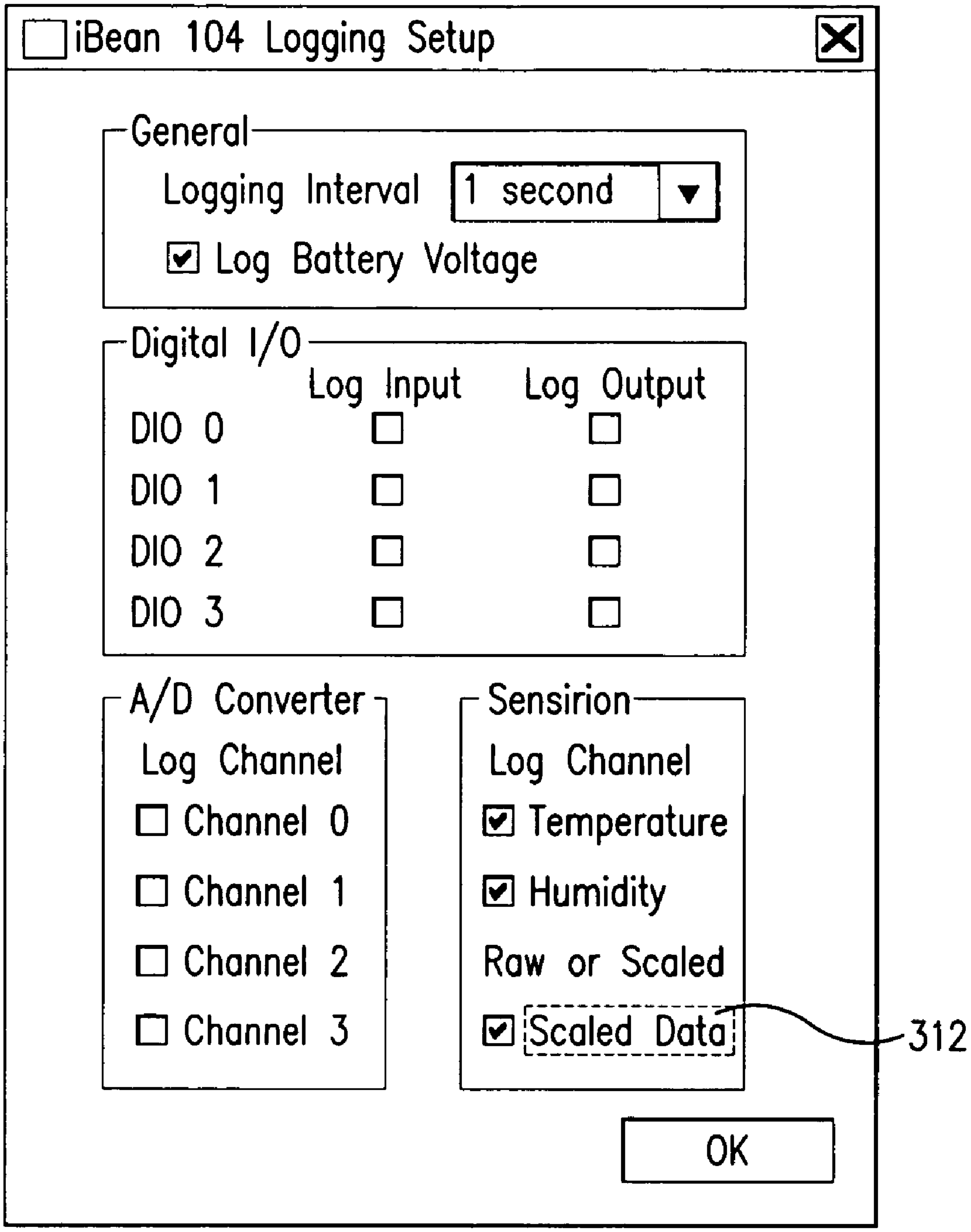
FIG. 10 shows a logging menu according to an embodiment of the present invention.

From the menu Setup 310 selection, a user may enable, disable and setup an individual iBean's logging setup. The Logging setup dialog is shown in FIG. 10. A single jogger may be configured for logging using this screen. For example, the GUI may be used to set all iBeans (or endpoints) to the current setup (e.g., a batch setup). Individual iBeans may then be edited.

3. Logging Interval

In the present example, the logging interval may be set to the following values: 1 second, 5 seconds, 15 seconds, 30 seconds, 1 minute, 5 minutes, 15 minutes, 30 minutes, 60 minutes, 90 minutes, or longer intervals as needed. The logging interval may be set up in batch, or individually for each bean. Fields can be logged in a standard comma separated format. Additional logging parameter setups may be performed using the iMon Setup dialog.

4. Sensors

The Sensirion sensor is a serial type with two channels available, one for temperature and one for humidity with built in proprietary calculation abilities for interpreting the raw data. For analog sensors, raw or scaled data may be selected. Selecting Scaled Data 312 will result in the logged data from the sensor (raw or scaled) being multiplied by the slope with the offset added. Scaled data is the data used to adjust for differences in sensing devices.

5. iMon Setup Dialog

Figure 11:
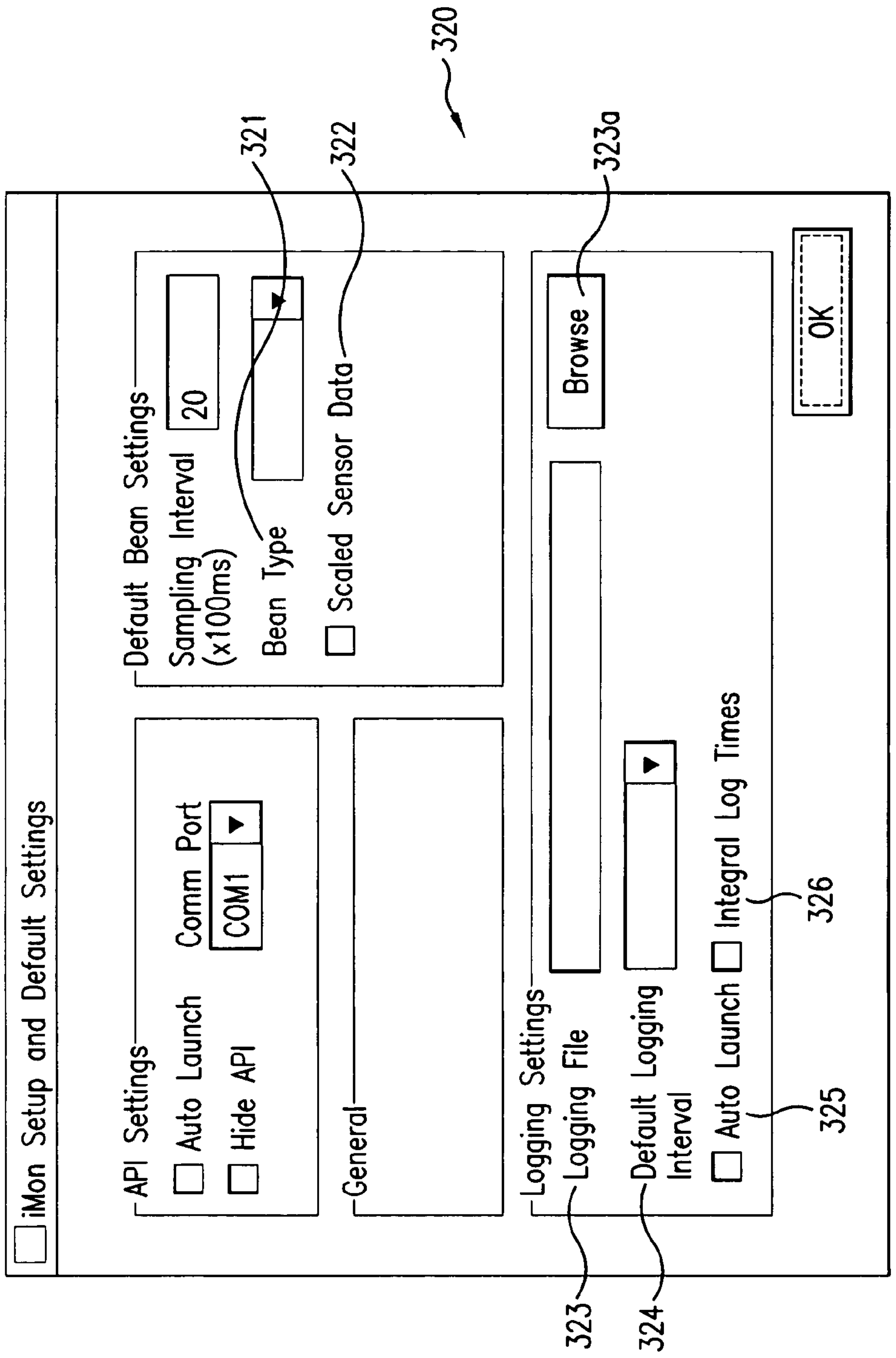
FIG. 11 shows a set-up dialog menu in accordance with an embodiment of the present invention.

A setup dialog is used to configure the iMon program, including logging. The dialog box 320 for the iMon setup is shown in FIG. 11. Settings used in the iMon Setup dialog are described below.

A Bean Type combo box 321 allows selection of the default bean type. Two types are supported in the present example: Normal and Sensirion. A Scaled Sensor Data box 322 is available only for the Sensirion type sensors, and allows a default selection for requesting scaled data from the sensor. In the present example there is no individual selection of scaled/raw for this sensor type. If scaled is selected, all sensors report scaled data.

A Logging File 323 is the path and the filename for the logging file which iMon creates. Files are in comma-separated ASCII format. The browse button **323*a* allows selection of directory and filename. A Default Logging Interval 324** may be used when creating new beans in the iMon application. The intervals are as described herein.

An Auto Launch 325 option automatically launches the logging system upon starting the program. In the present example, this option functions only in conjunction with API Auto Launch. Filenames and logging interval should be set prior to selection of this option or default settings will be used. An Integral Log Times 326 option delays the first logging sequence until the log time falls on a minute or hour boundary.

B. Alarm and Event Specification

As well as logging data, iMon also monitors each iBean's data and checks it against predetermined levels. Should an iBean's data fall outside the predetermined boundaries, an alarm condition may be raised. The functionality of the event, the alarm components of iMon, and the user interface changes that result are described below.

1. Alarms

As used herein, an alarm is a condition where a logged quantity exceeds a user-specified limit. Having an alarm based on a fixed absolute value may be of limited value. Instead, an alarm in the present example can be based on a comparison of an individual iBean's readings to a group of similar iBeans. Should the iBean's reading be outside a limit based on a group average, the alarm condition will be raised. iMon can identify each iBean with an elevation, position, or location. Beans within each elevation can be compared to each other's average reading for alarm comparison purposes.

Alarm conditions may be set globally for battery voltage, such as for a low level, absolute value voltage. Each iBean can be checked against this limit. Each iBean's battery voltage can be checked against the global alarm value.

Alarm conditions may be set per iBean for iBean digital inputs. Alarms may be set for active high or low level. Alarm conditions may be set per elevation for A/D inputs. A high or low alarm may be set. The limit criteria may be either an absolute limit or a percentage limit in relation to other beans in the elevation. A high or low alarm may be set for temperature and humidity. The limit criteria may be either an absolute limit or a percentage limit in relation to other iBeans in the elevation.

2. Alarm Detection

As currently formatted, alarm checking occurs only at the logging interval time sample. For instance, assume a logging interval of 1 hour and that alarms are enabled. If the quantity being measured wanders outside the alarm limits during the hour, but is within bounds on the hour, no alarm condition will be raised.

3. Alarm Algorithm

Each bean (sensor) is identified as belonging to a specific elevation. Elevations can be North (N), Northwest (NW), West (W), Southwest (SW), South (S), Southeast (SE), East (E), and Northeast (NE). During each logging interval, all iBean readings within an elevation can be averaged to obtain a mean value. Each iBean's reading within the given elevation is then compared to the mean reading. If the iBean's reading falls outside the preset limit for that reading, the alarm condition for that elevation is raised. The elevation limit may be an absolute high or low value or a percentage value. Both a high and low limit may be set simultaneously.

4. Alarm Reporting

When an alarm is raised, the alarm condition can be reported to a particular operator (e.g., a Central Office). Reporting options include logging alarms to the alarm log file and sending an email to the central office. Alarms may also be entered into the iMon System Log. To avoid nuisance reporting, alarms can be reported only once. Alarm conditions can be reset by user command or by a Clear Raised Alarm "Event". The nature of the alarm clearing events is discussed below.

As currently formatted, one Alarm file is created for all active elevations. Elevation Alarm Files follow the following naming convention:

| Prefix_ElevationAlarms_Date_Time.dat, where: | |
|---|---|
| Prefix | specified on the PC Setup dialog. |
| Alarm | text "ElevationAlarms". |
| Date | MMDDYY when file created. |
| Time | HHMMSS when file created. |

A common alarm file as named above can contain all elevation alarms for a given instance of iMon. Alarms may also be entered into the iMon System Log.

Data fields in the file can be as follows: Date_Time, ID, Type, Elev, SampInt(sec), Group, Location, LogInt(sec), Battery, Alarm Hi Limit, Alarm Lo Limit, Elevation Average, Reading, and NumOfBeans.

5. Digital Alarms

At least one Alarm file can be created for all active digital alarms. Digital Alarm Files follow the following naming convention:

| Prefix_DigitalAlarms_Date_Time.dat, where: | |
|---|---|
| Prefix | specified on the PC Setup dialog. |
| Alarm | text "DigitalAlarms". |
| Date | MMDDYY when file created. |
| Time | HHMMSS when file created. |

A common alarm file as named above will contain all digital alarms for a given instance of iMon. Alarms may also be entered into the iMonSystemLog.

Data fields in the file are as follows: Date_Time, ID, Type, Elev, SampInt(sec), Group, Location, LogInt(sec), Battery, Alarm Hi, Alarm Lo, and Digital Input Status.

Figure 12:
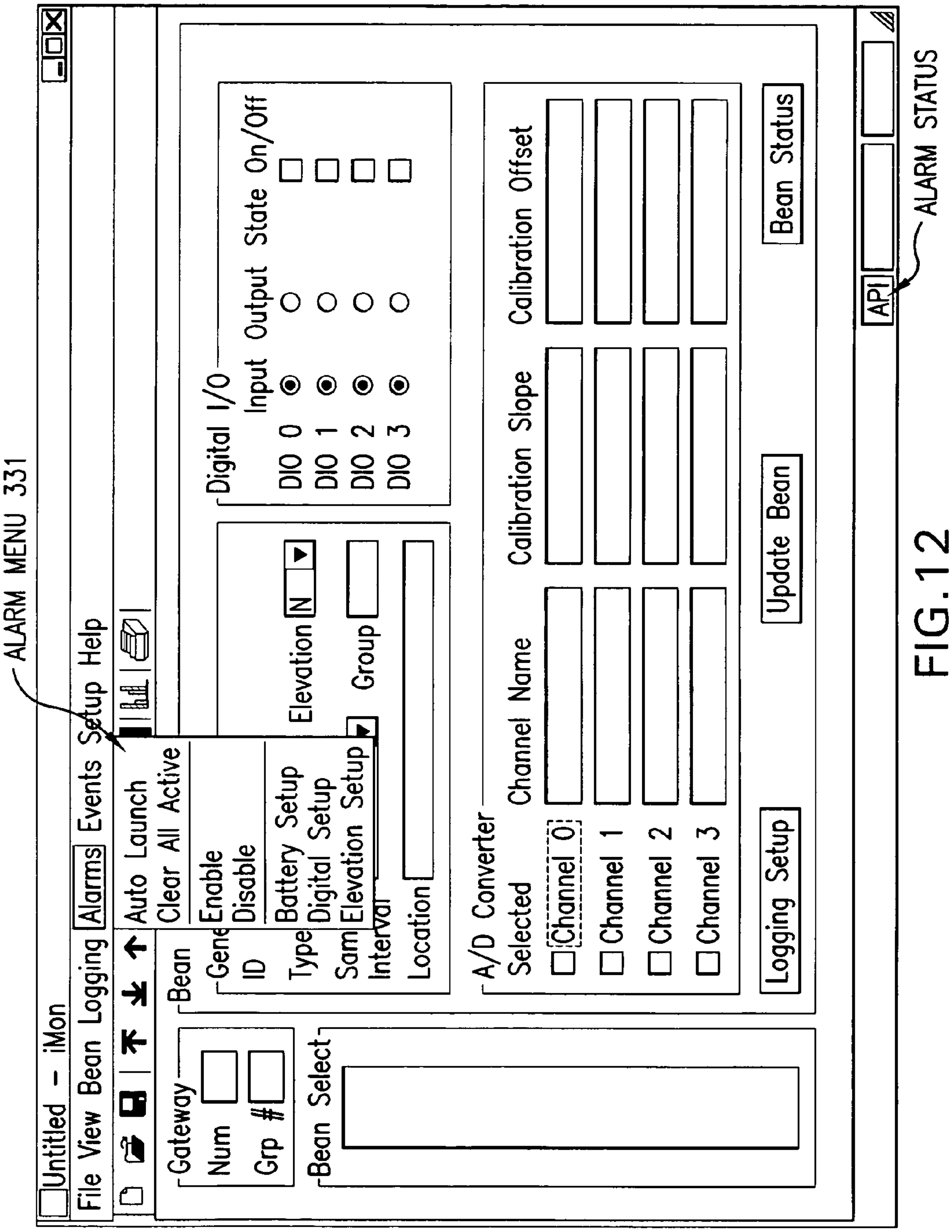
FIG. 12 shows an alarm user interface according to an embodiment of the present invention.

6. Alarm User Interface iMon's user interface can be changed in the following areas: menus and setup dialogs. FIG. 12 shows the changes to the Menu User Interface. The Alarms menu 330 supports an Auto Launch 331 option that will automatically launch the Alarm system on iMon launch.

7. Events and Event User Interface

Figure 13:
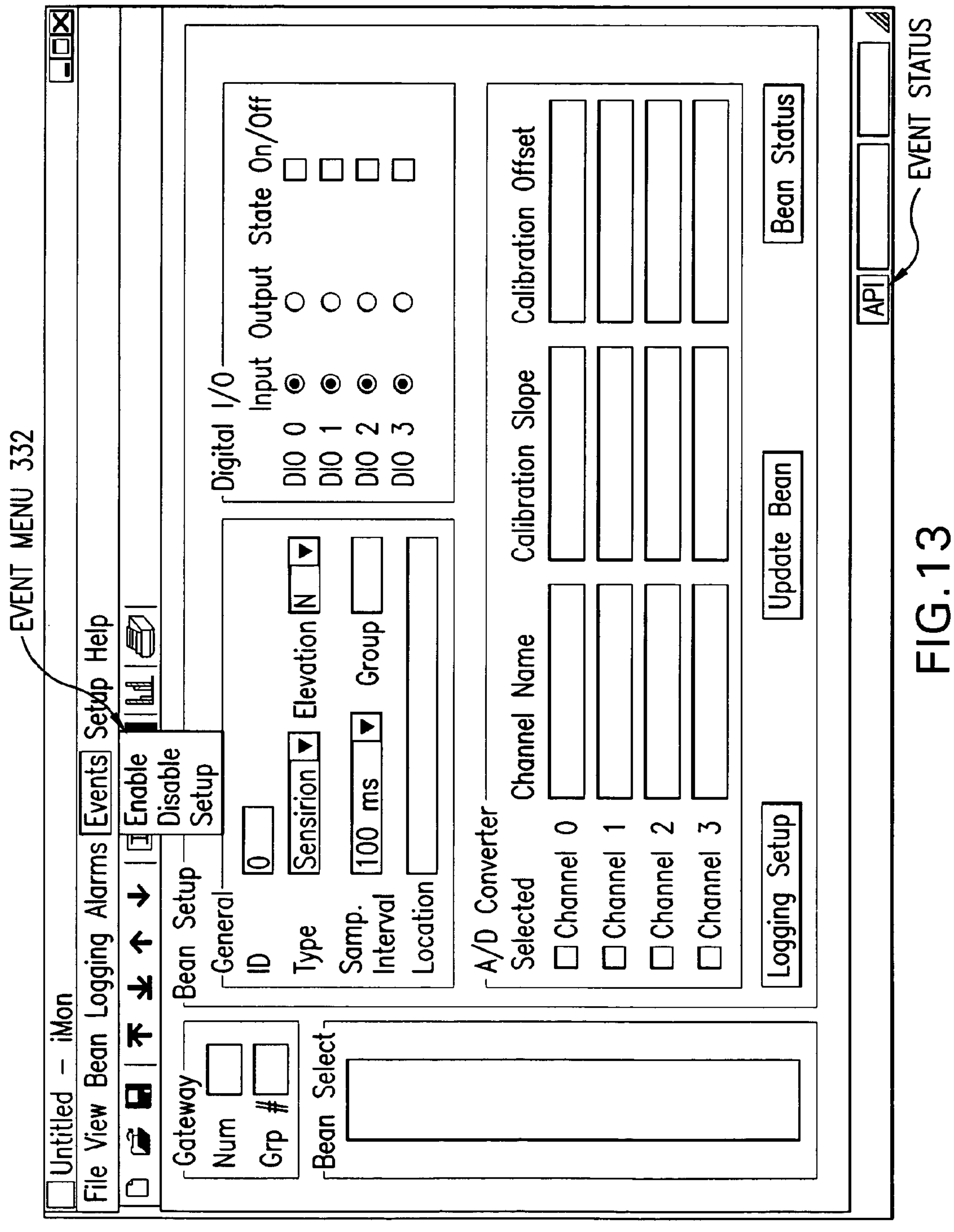
FIG. 13 shows an event user interface according to an embodiment of the present invention.

As shown in FIG. 13, the user can enable, disable, and setup system events from the Events menu 332 selection. An "Event" is a programmable action that may be executed at some point in the future based on an event condition. In the present example, the following event types are supported:

Time Event. A time event performs an action at some periodic time of the week (TOW) or time of the month (TOM). TOW and TOM are programmable. Time event actions include the transfer of all files in the logging directory to the central office server and archiving the logging directory.

Clear Raised Alarms. Selection of this option clears all raised alarms on a TOW and TOM basis.

The foregoing description of the exemplary embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method comprising:

associating a first value of a first parameter measured by a first sensor at a first time with a first geometric shape comprising a first size;

associating a second value of the first parameter measured by the first sensor at a second time with a second geometric shape comprising a second size; and displaying the first and second geometric shapes superposed on a graphic representation of a structure, wherein a position of the displayed first and second geometric shapes corresponds substantially to a position of the first sensor disposed in the structure, and wherein the first geometric shape comprises a circle and the second geometric shape comprises a ring.

2. A method comprising:

associating a first value of a first parameter measured by a first sensor at a first time with a first geometric shape comprising a first size;

associating a second value of the first parameter measured by the first sensor at a second time with a second geometric shape comprising a second size; and displaying the first and second geometric shapes superposed on a graphic representation of a structure, wherein a position of the displayed first and second geometric shapes corresponds substantially to a position of the first sensor disposed in the structure, and wherein the displayed second geometric shape circumscribes the displayed first geometric shape.

3. A method comprising:

associating a first value of a first parameter measured by a first sensor at a first time with a first geometric shape comprising a first size;

associating a second value of the first parameter measured by the first sensor at a second time with a second geometric shape comprising a second size; and displaying the first and second geometric shapes superposed on a graphic representation of a structure, wherein a position of the displayed first and second geometric shapes corresponds substantially to a position of the first sensor disposed in the structure, and wherein the displayed second geometric shape circumscribes the displayed first geometric shape and the displayed second geometric shape and the displayed first geometric shape are concentric with one another.

4. A computer-readable medium on which is encoded program code, the program code comprising:

program code for associating a first value of a first parameter measured by a first sensor at a first time with a first geometric shape comprising a first size;

program code for associating a second value of the first parameter measured by the first sensor at a second time with a second geometric shape comprising a second size;

program code for displaying the first and second geometric shapes superposed on a graphic representation of a structure, a position of the displayed first and second geometric shapes corresponding substantially to a position of the first sensor disposed in the structure; and program code for displaying the second geometric shape circumscribing the first geometric shape.

5. A computer-readable medium on which is encoded program code, the program code comprising:

program code for associating a first value of a first parameter measured by a first sensor at a first time with a first geometric shape comprising a first size;

program code for associating a second value of the first parameter measured by the first sensor at a second time with a second geometric shape comprising a second size;

program code for displaying the first and second geometric shapes superposed on a graphic representation of a structure, a position of the displayed first and second geometric shapes corresponding substantially to a position of the first sensor disposed in the structure;

program code for displaying the second geometric shape circumscribing the first geometric shape; and program code for displaying the first and second geometric shapes concentric with one another.

* * * * *

UNITED STATES PATENT AND TRADEMARK OFFICE

CERTIFICATE OF CORRECTION

PATENT NO. : 7,130,757 B2
APPLICATION NO. : 11/003911
DATED : October 31, 2006
INVENTOR(S) : Wallace Dale Corwin et al.

It is certified that error appears in the above-identified patent and that said Letters Patent is hereby corrected as shown below:

In col. 2, line 40, the phrase "system may able" should read -- system may be able --.

In col. 10, line 2, the phrase, "building 111" should read, -- building 11 --.

Signed and Sealed this

Seventeenth Day of April, 2007

JON W. DUDAS
*Director of the United States Patent and Trademark Office*